United States Patent [19]
Milway et al.

[11] Patent Number: 6,122,279
[45] Date of Patent: Sep. 19, 2000

[54] ASYNCHRONOUS TRANSFER MODE SWITCH

[75] Inventors: David Russell Milway, Cottenham; David James Greaves; Brian James Knight, both of Cambridge, all of United Kingdom

[73] Assignee: Virata Limited, Cambridge, United Kingdom

[21] Appl. No.: 08/538,106

[22] Filed: Oct. 2, 1995

[51] Int. Cl.[7] .................................................. H04L 12/56
[52] U.S. Cl. .......................................................... 370/395
[58] Field of Search ..................... 370/359, 395, 370/394, 351, 352, 353, 475, 392, 396, 397, 400, 399, 412–418, 389, 401, 229, 230, 231, 232, 235, 522, 317, 465

[56] References Cited

U.S. PATENT DOCUMENTS

| | | | |
|---|---|---|---|
| 4,791,629 | 12/1988 | Burns et al. | 370/363 |
| 5,062,106 | 10/1991 | Yamazaki et al. | 370/397 |
| 5,165,021 | 11/1992 | Wu et al. | 370/412 |
| 5,210,749 | 5/1993 | Firoozmand | 370/463 |
| 5,235,592 | 8/1993 | Cheng et al. | 370/451 |
| 5,235,595 | 8/1993 | O'Dowd | 370/392 |
| 5,237,565 | 8/1993 | Henrion et al. | 370/236 |
| 5,241,536 | 8/1993 | Grimble et al. | 370/416 |
| 5,265,207 | 11/1993 | Zale et al. | 370/408 |
| 5,285,446 | 2/1994 | Yonehara | 370/234 |
| 5,311,513 | 5/1994 | Ahmadi et al. | 370/230 |
| 5,313,454 | 5/1994 | Bustini et al. | 370/231 |

(List continued on next page.)

FOREIGN PATENT DOCUMENTS

| | | |
|---|---|---|
| 0 472 408 A2 | 2/1992 | European Pat. Off. . |
| 0 603 916 A2 | 6/1994 | European Pat. Off. . |
| 84100108 | 8/1995 | Taiwan . |
| WO 95/17787 | 6/1995 | WIPO . |

OTHER PUBLICATIONS

Silberschatz et al., *Operating System Concepts*, 3d Ed., Addison–Wesley Publishing Co., 1991, pgs. 118–19.

Giacopelli, J. N. et al., "Sunshine: A High–Performance Self–Routing Broadband Packet Switch Architecture," *IEEE Journal On Selected Areas In Communications*, vol. 9, No. 8, Oct. 1, 1991.

Schultz, K. J. et al., "Distributed Multicast Contention Resolution Using Content Addressable FIFOs," Serving Humanity Through Communications, Supercom/ICC, New Orleans, May 1–5, 1994, vol. 3, May 1994, Institute of Electrical and Electronics Engineers, pgs. 1495–1500.

Rašković et al., "An Implementation of Hash Based ATM Router Chip", in *Proceedings of the Twenty–Eighth Hawaii International Conference on System Sciences*, vol. I: Architecture, The Institute of Electrical and Electronics Engineers, Inc., pp. 32–40 (1995).

*Primary Examiner*—Dang Ton
*Attorney, Agent, or Firm*—Pennie & Edmonds LLP

[57] ABSTRACT

A switching device for switching ATM cells from a plurality of network input links to a plurality of network output links comprises a plurality of ports containing line interfaces and input and output buffers, a hardware switch controller, a microprocessor, and memory for storing routing tables and system software. All these elements are interconnected via a processor bus, and additionally, the ports are interconnected by a separate switching bus. The switch controller employs hash-based routing table indexing to route cells from selected input ports to appropriate output ports according to the cells' header information. Switch requests generated by incoming cells are arbitrated using a token bus allocation scheme. The majority of cells are switched almost entirely in hardware, but the microprocessor can assume control of the switching architecture to resolve exception conditions and to perform special processing on selected virtual circuits. Two output buffers per port are provided; one for high-priority cell, another for lower priority cells. Additionally, a common overflow buffer is provided to temporarily store cells intended for output buffers momentarily full.

51 Claims, 15 Drawing Sheets

U.S. PATENT DOCUMENTS

| | | | |
|---|---|---|---|
| 5,315,593 | 5/1994 | Adachi et al. | 370/401 |
| 5,323,389 | 6/1994 | Bitz et al. | 370/397 |
| 5,341,376 | 8/1994 | Yamashita | 370/466 |
| 5,359,592 | 10/1994 | Corbalis et al. | 370/233 |
| 5,361,255 | 11/1994 | Diaz et al. | 370/347 |
| 5,381,410 | 1/1995 | Grenot | 370/352 |
| 5,390,176 | 2/1995 | Schoute et al. | 370/395 |
| 5,394,397 | 2/1995 | Yanagi et al. | 370/390 |
| 5,396,490 | 3/1995 | White et al. | 370/474 |
| 5,533,720 | 7/1996 | Bryan et al. | 370/412 |
| 5,550,323 | 8/1996 | Irie et al. | 370/413 |

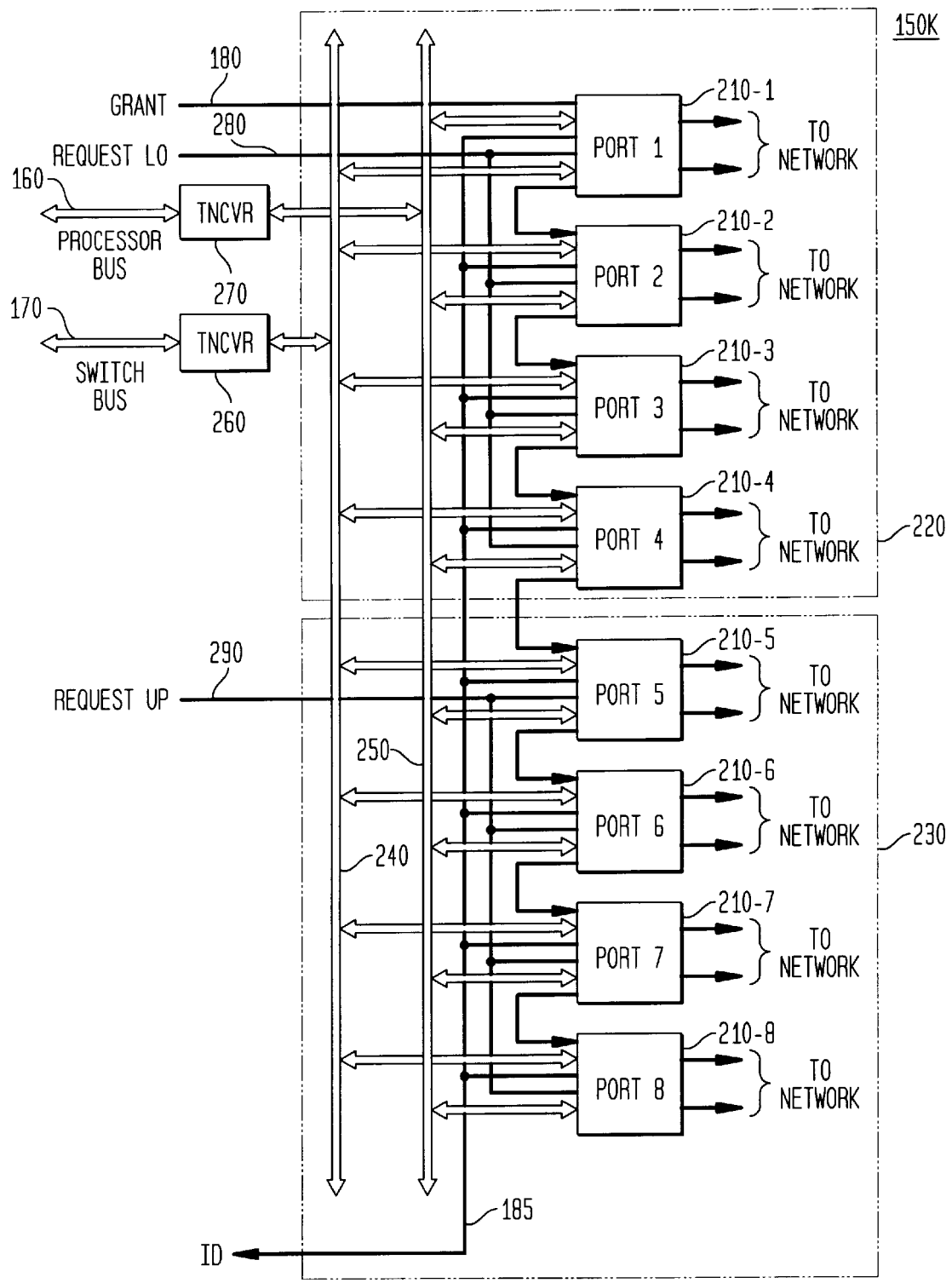

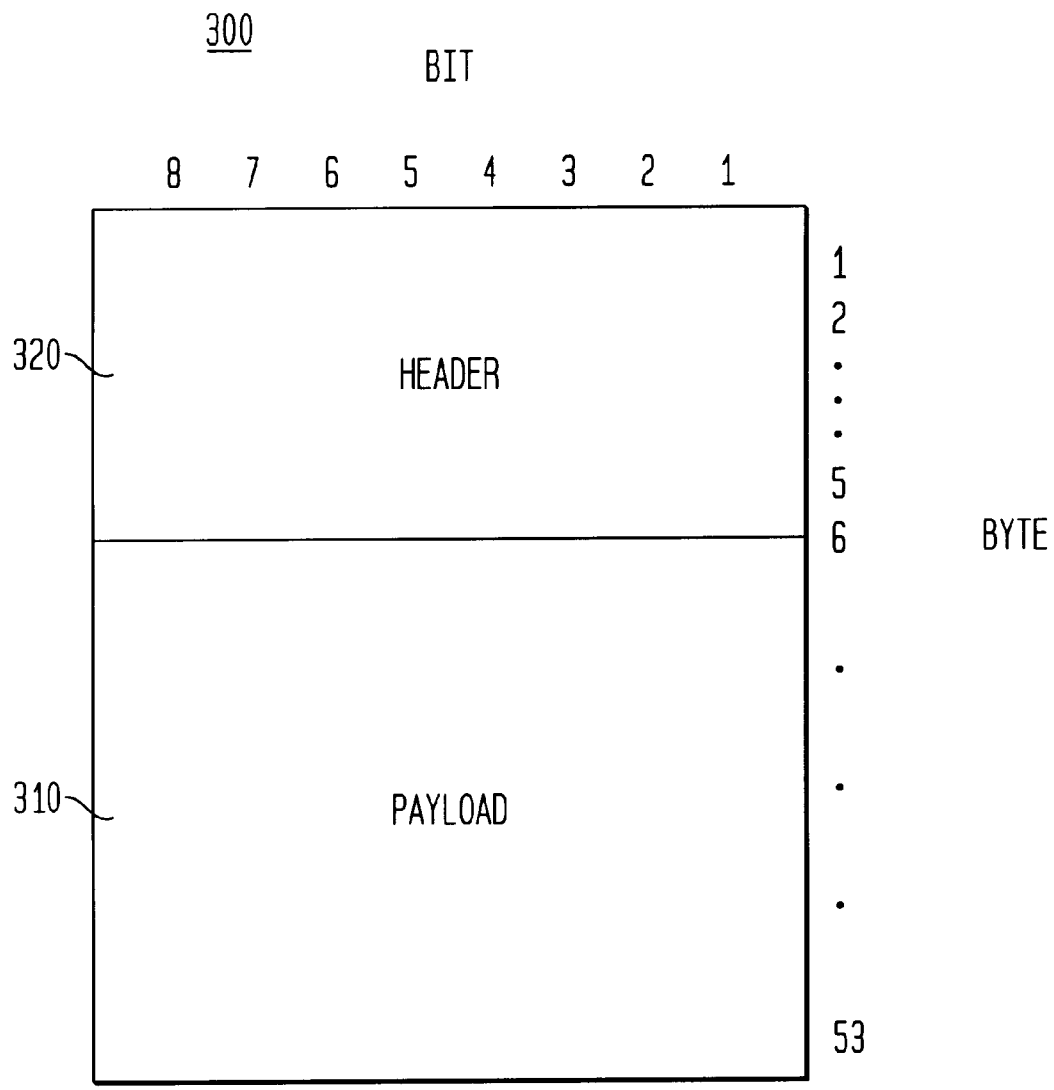

ASYNCHRONOUS TRANSFER MODE SWITCH

TECHNICAL FIELD

The present invention relates generally to the field of data communication networks. More specifically, the present invention relates to asynchronous transfer mode switching devices for use in local area networks.

BACKGROUND OF THE INVENTION

The advent of the multimedia PC has been one of the key developments in the computer industry in the 1990s. Originally the term multimedia PC was loosely defined to refer to a personal computer with a CD-ROM and audio capabilities. Recently, however, new applications such as video conferencing, video-on-demand, interactive TV, and virtual reality have been proposed. Rather than the mere integration of text, audio and video, the nature of these applications require the transfer of high volumes of data between multiple users. As a result, it is now widely recognized that for multimedia to reach its full potential it must become a network based technology rather than a limited local resource.

Unfortunately, the real-time nature of multimedia video and audio streams renders existing local area networks ("LANs") unsuitable for these applications. Conventional LAN designs, most of which are based upon shared media architectures such as Ethernet and Token Ring, have no capability to guarantee the bandwidth and quality of service necessary to accommodate multimedia services. As such, these networks cannot efficiently handle high-speed, real-time video and audio data without introducing significant distortions such as delay, echo and lip synchronization problems.

Some network managers have responded to the increased demand for bandwidth by using routers and bridges to divide LANs into more segments, each with fewer users. In this manner, multimedia applications do not encounter significant competition for network resources from other forms of data traffic. However, such solutions alleviate congestion at the price of network complexity, and ultimately destroy a network's overall usefulness as a vehicle for sharing information.

A few modified forms of existing network technologies have been explored as platforms for multimedia transmissions. For instance, Isochronous Ethernet and Fiber Distributed Data Interface ("FDDI") can guarantee a minimum bandwidth connection to multimedia applications thereby providing the quality of service necessary to prevent distortions. However, such capability can only be provided under severe traffic constraints which are necessary to avoid unacceptable network performance degradation.

Recently, as the need for an alternative networking technology to accommodate multimedia in the LAN setting has become apparent, researchers have explored the technologies proposed for the Broadband Integrated Digital Services Network ("B-ISDN"). As high bandwidth requirements and bursty data transmission are commonplace in this wide area network, solutions used in B-ISDN may be applicable to the multimedia LAN environment.

Specifically, the B-ISDN standards, promulgated by the International Telegraph and Telephone Consultative Committee ("CCITT"), now reorganized as the Telecommunications Standardization Sector of the International Telecommunication Union ("ITU-T"), define a packet multiplexing and switching technique, referred to as Asynchronous Transfer Mode ("ATM"). This technique is well known in the art and is described in various references. E.g., Martin de Prycker, *Asynchronous Transfer Mode: Solution for Broadband ISDN* (2nd Ed., Ellis Horwood Ltd, West Sussex, England, 1993).

In ATM, information is carried in packets of fixed size, specified for B-ISDN as 53 bytes, called cells. Those cells are individually labelled by addressing information contained in the first 5 bytes of each cell. Cells from multiple sources are statistically multiplexed into a single transmission facility. Although ATM evolved from Time Division Multiplexing concepts, cells are identified by the contents of their headers rather than by their time position in the multiplexed stream. A single ATM transmission facility may carry hundreds of thousands of ATM cells per second originating from a multiplicity of sources and travelling to a multiplicity of destinations.

ATM is a connection-oriented technology. Rather than broadcasting cells onto a shared wire or fiber for all network members to receive, a specific routing path through the network, called a virtual circuit, is set up between two end nodes before any data is transmitted. Cells identified with a particular virtual circuit are only delivered to nodes on that virtual circuit and the cells transmitted on a particular virtual circuit are guaranteed to arrive in the transmitted order at the destination of the virtual circuit. ATM also defines virtual paths, bundles of virtual circuits traveling together through at least a portion of the network, the use of which can simplify network management.

The backbone of an ATM network includes switching devices capable of handling the high-speed ATM cell streams. These devices perform the functions required to implement a virtual circuit by receiving ATM cells from an input port, analyzing the information in the header of the incoming cells in real-time, and routing them to the appropriate destination port. Millions of cells per second need to be switched by a single switch.

Unlike conventional LAN designs, an ATM network makes no guarantees that it will deliver each and every packet to its intended destination. Rather, ATM provides the capability of offering multiple grades of service in support of various forms of traffic requiring different levels of cell loss probability and propagation delay. It is known, for instance, that many multimedia connections, e.g., video streams, can tolerate relatively large cell losses, but are very sensitive to delay variations from one cell to the next. In contrast, traditional forms of data traffic are more tolerant of large propagation delays and delay variance, but require very low cell losses. Because of its ability to handle diverse data streams, ATM appears to be an ideal platform for a LAN supporting both multimedia and conventional data transmission.

Despite the apparent applicability of ATM technology to the LAN environment, most existing ATM switches are not suitable for use in such an environment, for example, office or campus settings. Although a variety of problems exist, the principal barrier is cost: current switches, designed for use in large public networks cannot be cost-effectively installed in a local area network.

Much of the cost of current ATM switches can be attributed to expensive memory devices. Most conventional switches employ large First-In First-Out ("FIFO") memories at port inputs or outputs to queue cells awaiting transmission. Although this type of design is relatively simple, the high cost of such FIFO memories prices these switches out of the private market. Nor can these buffers simply be reduced in size: switches with reduced buffer sizes cannot achieve cell loss probabilities low enough to reliably handle the typical data traffic that LANs typically must accommodate.

Some switch designers have attempted to reduce the cost of large individual port buffer queues by replacing them with central shared buffer memories. These shared buffers may be smaller than the combined memory size of the individual port queues, because buffer space unused by a single port may be allocated to the other ports. However, the memory management schemes needed to maintain distinct cell queues within these shared buffers are quite complex. This complexity requires additional processing within the switch.

Nor is the cost attributable to memory devices limited to buffer queues. Additionally, most conventional switches employ large header translation look-up tables for each individual port. These tables must be large enough to support the large number of connections that a few ports of a switch may have to support, but typically most ports will have relatively few connections. Thus, table memory is wastefully reserved for these quiet ports.

Furthermore, despite their high-bandwidth performance, most current ATM switching systems have not been designed to accommodate the special requirements of many new multimedia applications. For instance, services such as video-on-demand or video conferencing between multiple locations require the capability to send the same cells to several destination users. Therefore, a "broadcast" or "multicast" facility within the switching system is essential to produce several copy cells from one received cell and to send those copy cells to the several destination systems. Although many conventional switching systems do provide some multicast capability, typically the capability has been added to switch architectures designed for switching cells from an input port to a single output port. These switches, which often must undertake a switching operation for each specified output port, cannot perform multicast cell switching without serious reduction in throughput performance. Processing of many multicast streams in a single switch can lead to severe network disturbance.

Additionally, because a wide variety of data traffic and network protocols can be expected in an ATM network integrated into a LAN environment, functions such as traffic shaping, policing and gateway translation may be required within the switches. However, currently the only switches possessing the flexibility necessary to handle these functions are full software switches which have the processing power to perform these tasks. Unfortunately, conventional software switches cannot achieve the cell throughput necessary to support the high-bandwidth requirements of multimedia streams.

Furthermore, switches designed for use in B-ISDN or other wide area networks are not easily adaptable to the different standards which will be applied in the LAN setting. Organizations such as the ATM Forum have already begun to produce ATM LAN standards which deviate in some significant ways from the CCITT standards. Furthermore, this standardization is by no means complete; current switches do not provide a mechanism for upgrading in the face of a constantly evolving standards environment.

Therefore, a need persists for an ATM switching device tailored to handle multimedia cell streams in a LAN environment, such as an office. Such a device would be inexpensive, easily upgradeable, and able to manage the special requirements of today's multimedia applications.

SUMMARY OF THE INVENTION

The present invention relates to an improved switching device for switching ATM cells from a plurality of network input links to a plurality of network output links. The invention comprises a plurality of ports containing line interfaces and input and output buffers, a hardware switch controller, a microprocessor, and memory for storing routing tables and system software. All these elements are interconnected via a processor bus, and additionally, the ports are interconnected by a separate switch bus.

Switching occurs in three distinct phases: input port selection, header processing and cell copying. These phases operate both serially and simultaneously, thereby increasing switching speed. For instance, as the cell copying phase of one switch cycle is being performed, the header processing phase of the next switch cycle will be occurring, and at the same time the input port of the following switch cycle is being selected.

Ports containing received cells in their input buffers generate switching requests which are arbitrated by a token bus scheme. A port receiving the token requests a switch cycle which is initiated by the microprocessor. Control of the switching architecture is then passed to the switch controller. The switch controller reads the header of the first cell in the selected port's input buffer and hashes the routing identifier, which may be a VCI or VPI, contained within the header with the port's identifying number to create a routing table index. The switch controller uses this index to obtain a routing tag and new header descriptor from a routing table stored in memory. The routing tag specifies which output ports should receive the cell. Control logic in all ports will read the old header and routing tag simultaneously with the switch controller. The output ports designated by the routing tag will also read the new header descriptor. The switch controller will issue a cell copy command causing the selected input port to place the information payload of the current cell onto the switch bus where it will be read by the selected output ports. The output ports will construct a new header from the old header and new header descriptor and place the entire cell into an output buffer to await transmission.

The microprocessor oversees the entire switching operation, but does not intervene in the typical switch cycle. In this manner, the majority of cells are switched entirely in hardware to achieve fast processing speed. However, in the event of an error condition or the switching of a cell requiring special processing the microprocessor can assume control of the switching architecture, complete the switch cycle, and perform other specified tasks. The capability to perform functions, such as gateway translation, is incorporated without degrading switching speed beyond that necessary to perform the requisite function. Therefore, the flexibility of a software switch is achieved while retaining the speed of a hardware architecture.

Multicast switch cycles are handled efficiently through a slightly extended switch cycle where routing tags and new header descriptors are issued for each set of selected output ports requiring a unique header. The multicast cell is transferred in one operation from the input port simultaneously to all specified output ports. Therefore, time consuming cell copies required by prior art switches are eliminated.

Virtual path switching is performed in the same manner as virtual circuit switching using a single routing table. Virtual path encapsulation is achieved by setting routing table entries for incoming VCIs such that the headers of outgoing cells are modified to contain non-zero VPIs. Virtual path de-encapsulation is also supported requiring only a slightly extended switch cycle.

In another aspect of the invention, a common overflow buffer is provided to alleviate congestion conditions and permit the use of smaller port buffers. Cells intended for output buffers which are already full are diverted to this common overflow buffer. To maintain the order of cells, cells belonging to a particular virtual circuit will also be diverted if any cells of that virtual circuit are already resident in the overflow buffer. After the overflow condition subsides, cells in the overflow buffer are removed in the order they were placed there and delivered to the appropriate output buffer. In this manner, port buffer size is reduced without introducing significant complexity during each switch cycle.

In yet another aspect of the invention, two output buffers per port are provided to prioritize outgoing traffic. One buffer is the high-priority buffer intended for cells of connections which cannot tolerate significant delay or delay jitter, such as multimedia video and audio streams. The other buffer is for lower-priority traffic. All cells resident in the high-priority buffer will be transmitted before any cells in the low-priority buffer.

BRIEF DESCRIPTION OF THE DRAWINGS

A more complete understanding of the invention may be obtained by reading the following description in conjunction with the appended drawings in which like elements are labeled similarly and in which:

FIG. 2 is a functional block diagram of a port cluster used in the ATM switch of FIG. 1;

FIG. 3A is a diagram of an ATM cell as defined by the CCITT;

DETAILED DESCRIPTION OF THE INVENTION

In the following description, numerous specific details are set forth in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

Furthermore, although what is described herein is a switching system for use in ATM networks, it should be understood that the present invention is in no way limited in applicability to ATM networks as defined by the CCITT. Rather, one skilled in the art will recognize that the principles described herein may be employed in a wide variety of packet switching networks. For examples of some alternative networks see de Prycker, pp. 50–58.

Figure 1:
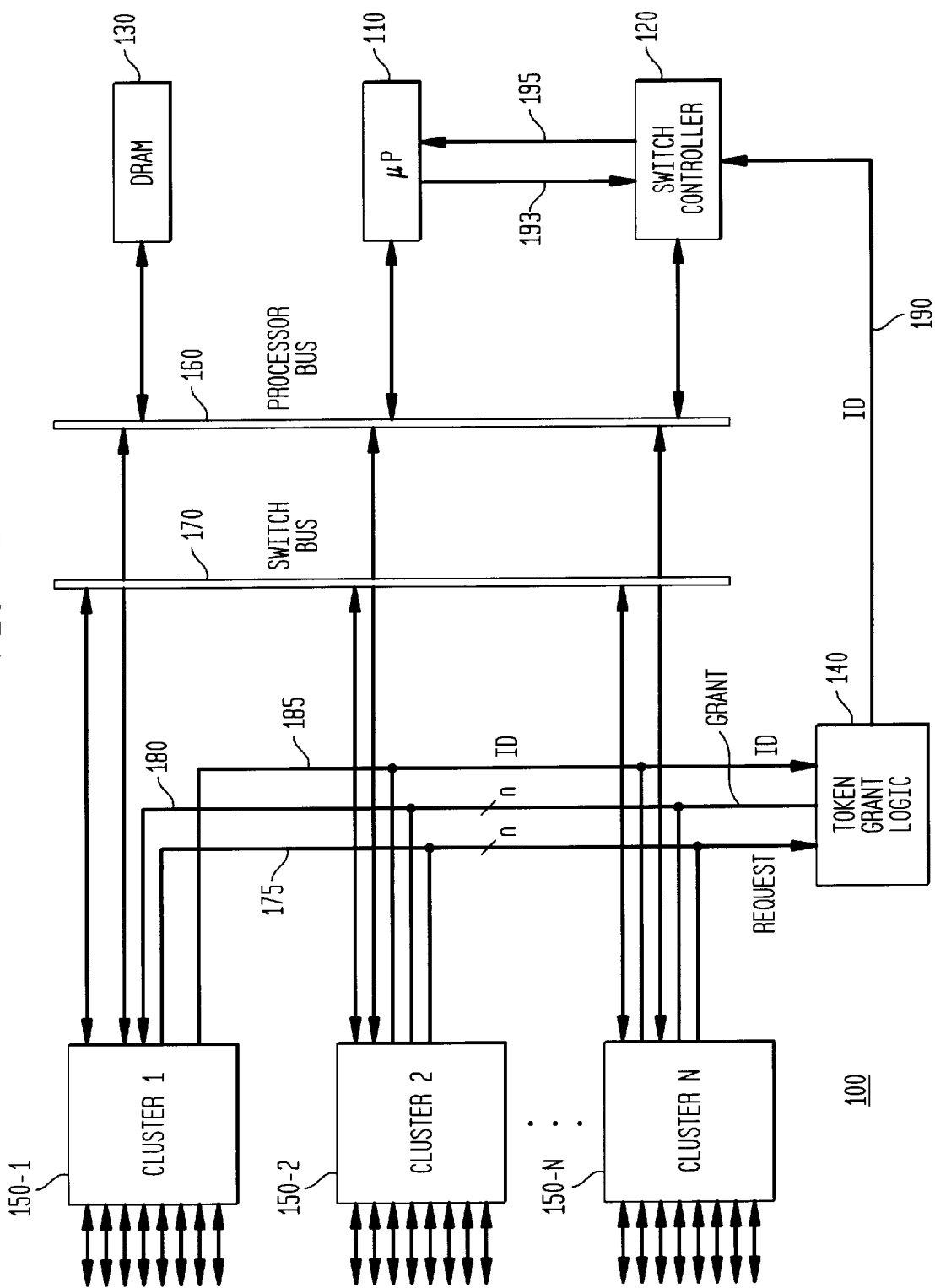
FIG. 1 is a functional block diagram of an embodiment of an ATM switch in accordance with the principles of the present invention.

A block diagram of an ATM switch 100 constructed in accordance with the principles of the present invention is shown in FIG. 1. Switch 100 comprises a microprocessor 110, a switch controller 120, DRAM memory 130, token grant logic 140, and port clusters 150-1 to 150-n. Each port cluster 150-k contains the line interfaces, port logic, and buffering for up to eight ATM network connections. All of these functional blocks, with the exception of token grant logic 140, are interconnected by processor bus 160. Processor bus 160, shown as a single bus in FIG. 1 for the sake of clarity, actually comprises three separate physical buses: a data bus, an address bus, and a bus carrying system timing and control signals. References to processor bus 160 below are intended to indicate the data bus, unless otherwise noted. Bus cycles along processor bus 160 are generated either by microprocessor 110 itself or by switch controller 120, as described in more detail below. In addition, port clusters 150-1 to 150-n are interconnected via a switch bus 170, operating at 32 MHz, along which ATM cell copying is performed.

The grouping of up to eight individual ATM ports into a single port cluster 150-k is intended to eliminate the need for complex bus circuitry. A single bus connecting all ports of a large switch would require costly high-performance bus drivers to meet the necessary loading requirements. Additionally, a bus physically long enough to connect all the ports would be susceptible to bus reflections, attenuation and noise problems which could only be corrected with sophisticated S bus design. The present invention employs a hierarchical bus structure to eliminate these difficulties and permit the use of cost-effective components. As shown in FIG. 2, each port cluster 150-k contains its own local processor bus 250 and switch bus 240 interconnecting the ports 210-1 to 210-n of that cluster. The cluster 150-k of FIG. 2 is shown with a full complement of eight individual ports, but fewer ports may be installed. Bus loading on these local buses is manageable since, in the preferred embodiment, a maximum of eight ports will be resident in a single cluster, and presumably, bus lengths will be short because clustered ports can be expected to be physically located together. Data passing between the ports 210-1 to 210-n of an individual cluster 150-k, therefore, should not encounter any significant bus degradation.

Referring now to both FIGS. 1 and 2, cell data is delivered from cluster 150-k to cluster 150-1 by switch bus 170. Local switch bus 240 in each cluster 150 is coupled to switch bus 170 through bidirectional bus transceiver 260. Bus transceiver 260 is designed such that data traveling out of cluster 150-k is latched onto switch bus 170, and data travelling from switch bus 170 into cluster 150-1 is buffered. This introduces a one clock cycle delay between availability of the data within cluster 150-k and availability of the data in the other clusters including cluster 150-4. The control signals are delayed correspondingly. However, this additional complexity is intended to counter any settling time problems which might otherwise occur. Likewise, local processor bus 250 is connected to processor bus 160 through bidirectional bus transceiver 270. In this fashion, heavily populated buses are kept relatively short, while the longer switch bus 170 and processor bus 160 have few connections. Advantageously, inexpensive bus drivers may be used and complex electrical bus conditioning need not be performed.

As the principal task of switch 100 is to route ATM cells from a plurality of input links to a plurality of output links, a description of a typical ATM cell would aid in comprehending the present invention. FIG. 3A shows the format of an ATM cell 300 as defined in CCITT Recommendation I.361. This format, adopted for use in B-ISDN and other wide-area networks, specifies a cell of 53 bytes: an information field or payload 310 of 48 bytes which contains the user information which is the object of the transmission and a cell header 320 of 5 bytes.

Figure 3B:
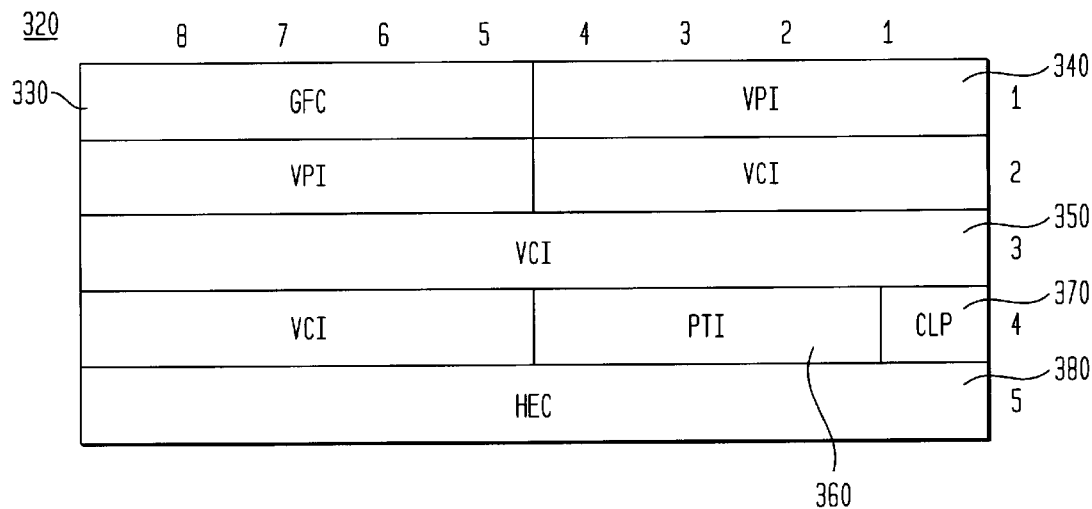
FIG. 3B is a diagram of an ATM cell header at the User-Network Interface as defined by the CCITT.

Cell header 320, or simply "header", is used for transmitting a variety of control information regarding the instant cell. FIG. 3B shows the structure of this header at the User Network Interface ("UNI"), that is the interface between an end-user device and an ATM switch. Here, the header is made up of a Generic Flow Control ("GFC") field 330 for specifying information which may be used to control traffic flow at the user-network interface, a virtual path identifier ("VPI") 340, a virtual circuit identifier ("VCI") 350, a Payload Type Identifier ("PTI") field 360 which provides information regarding the type of information contained in payload 310 of the cell, Cell Loss Priority ("CLP") flag 370 for setting the priorities relating to the abandonment of the cell during overload conditions, and a Header Error Control ("HEC") field 380 which contains an error control checksum for the previous four bytes in header 320.

Figure 3C:
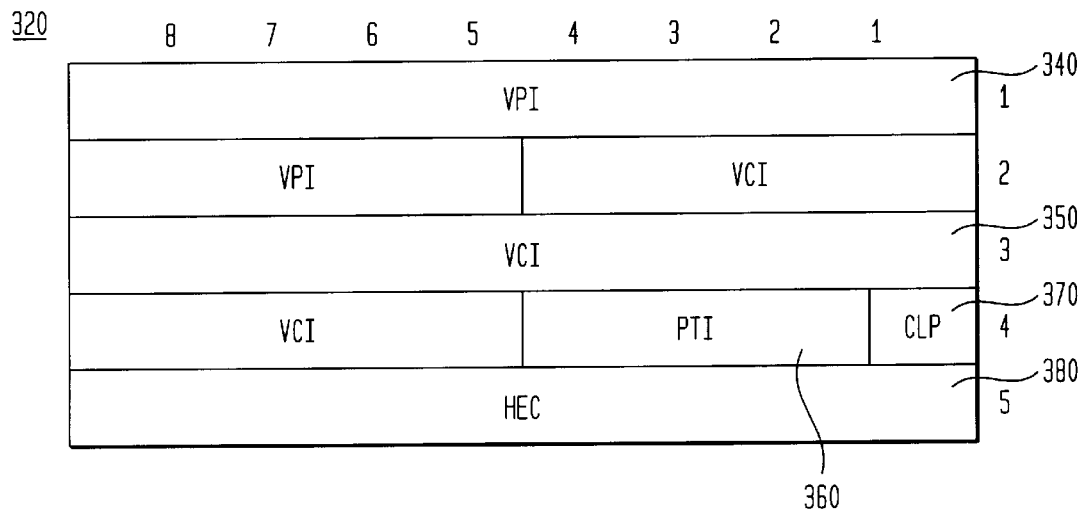
FIG. 3C is a diagram of an ATM cell header at the Network-Network Interface as defined by the CCITT.

FIG. 3C shows the format of header 320 at the Network-to-Network Interface ("NNI"), the interface between network switches. This header structure is identical to the structure at the UNI except GFC 330 is replaced with four additional bits of VPI 340. ATM networks do not provide for flow control of the type which is implemented in some packet networks and ATM networks have no facility to store cells over a long period of time. Therefore, inside an ATM network there is no need for generic flow control. Thus, GFC 330 may be eliminated in favor of an expanded VPI 340. However, if eight bits of VPI are sufficient, the header 320 of FIG. 3B may be used throughout the network. For more information regarding standard ATM cell formats see de Prycker, pp. 124–28. Of course, when alternative packet networks are implemented, a cell may be a packet or any other way to provide a collection of data on a network.

One skilled in the art will recognize that alternative fixed cell sizes are possible for use in an ATM LAN. However, because interoperability between local networks and wide area services is desirable, use of the standard 48-byte payload size is recommended. However, header size and format are not critical for interoperability with existing networks because headers are typically modified by ATM switches, while payloads are passed unaltered from one point to another. Therefore, header formats other than those shown in FIGS. 3B–3C may be utilized. See Dimitri Bertsekas & Robert Gallager, *Data Networks* (2nd ed., Prentice Hall, Englewood Cliffs, N.J., 1992), pp. 37–141, for examples of a variety of header structures suitable for use in a wide range of network technologies.

In an ATM network, information, such as audio, video and data, is transmitted by the cells through virtual paths and virtual circuits which are set up to facilitate such communications. The use of virtual paths and virtual circuits allows a large number of connections to be supported on a single physical communications link. The virtual paths comprise a plurality of virtual circuits which share the same physical resources through at least a portion of the network. Virtual paths/virtual circuits are allocated during set-up of a communication transmission between two network clients and are "torn down" after the communication has completed.

An ATM switch must accomplish two tasks when it receives a cell on an input port: (1) translation of the header information in the cell; and (2) transport of the cell from the input port to the correct output port. Proper translation of the routing identifiers, the VPI and VCI values, in the header is important because in a standard ATM network, although these values correspond to a virtual path or virtual circuit passing through the network, the values only have local significance. Therefore the VPI/VCI data is translated by each switch and changed prior to the cell being output from the switch. This translation is accomplished through the use of translation tables which are loaded with proper values when the connection is initially established. Much of the discussion which follows describing the switching functions of the present invention assumes that these translation tables have been properly created during connection set-up time under the auspices of microprocessor 110.

Figure 4:
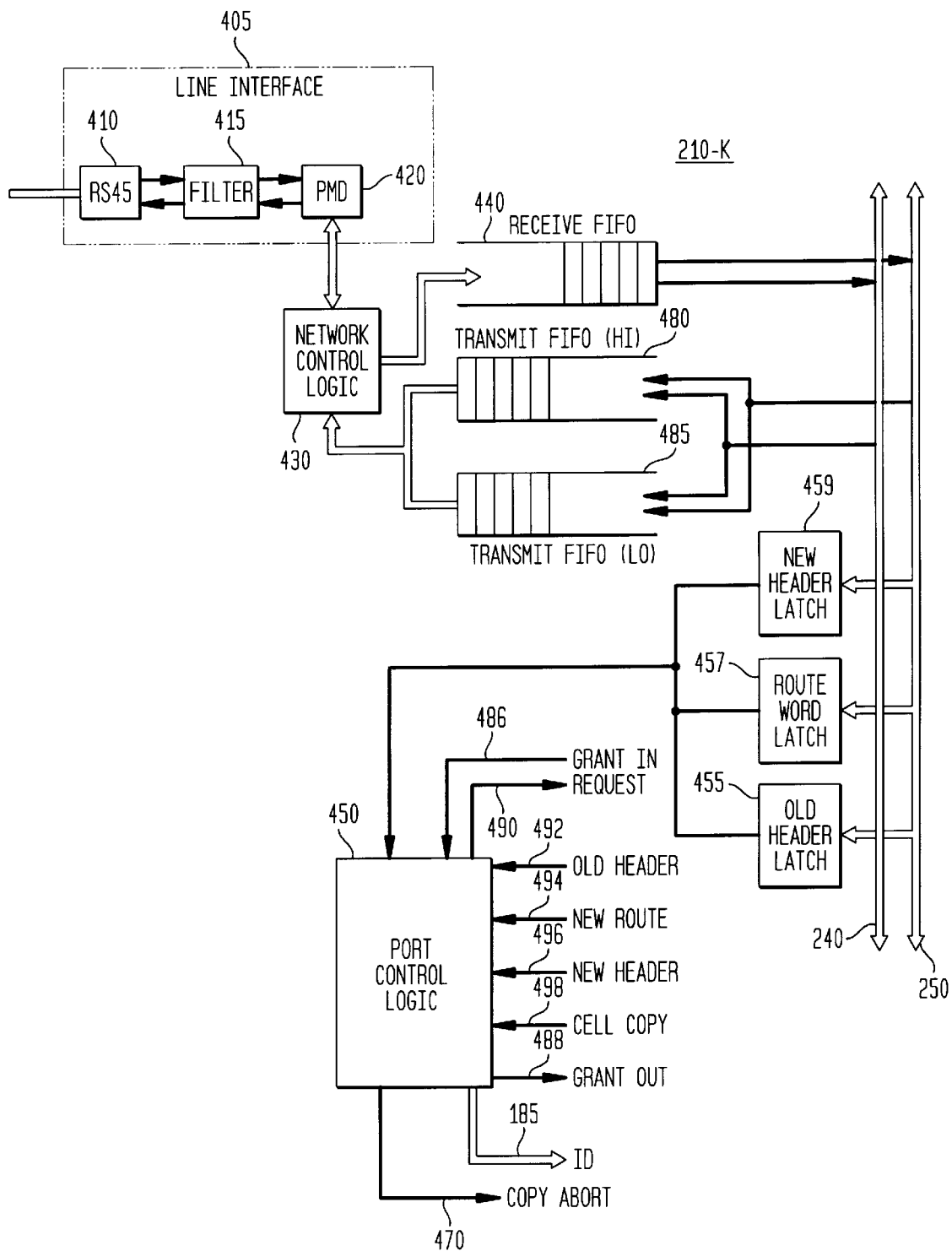
FIG. 4 is a functional block diagram of a port shown in FIG. 2 and used in the ATM switch of FIG. 1.

In operation, ATM cells are received by switch 100 via an ATM line interface 405 as shown in FIG. 4. FIG. 4 illustrates a block diagram of an individual port 210-i. The actual composition of line interface 405 depends upon the physical medium from which the ATM network is constructed. In the preferred embodiment line interface 405 connects via an RJ45 connector 410 to a 25.6 Mb/s ATM full-duplex link 400. The 25.6 Mb/s ATM physical layer is an ideal platform for most ATM networks operating in a LAN setting. Cabling requirements can be met with the ubiquitous voice-grade UTP 3 (Unshielded Twisted Pair) cable and widely used UTP 802.4 Token Ring physical layer components may be used to construct line interface 405. Signals from RJ45 connector 410 are passed through filter 415 to be delivered to Physical Media Dependent ("PMD") chip 420. Although a 25.6 Mb/s physical link is employed in the preferred embodiment, one skilled in the art will recognize that a wide variety of physical layers may be used. For example, the 25.6 Mb/s port may be replaced by a 100 Mb/s port or a 155 Mb/s port. Nor is there any requirement that all ports within switch 100 operate at the same speed. Therefore, one port may operate at 100 Mb/s while the others remain at 25.6 Mb/s. Of course, the components of line interface 405 must be altered to be compatible with the chosen ATM physical link. Only line interface 405 need be changed, as all other aspects of port 210-i and switch 100 can remain the same. It will be recognized, however, that to service a large number of high speed ports (e.g., 155 Mb/s) bus and processor speeds within the switch would need to be increased.

A new ATM cell arriving on input link 400 is converted from electrical signals to a bitstream by PMD chip 420. The bitstream is provided to network control logic 430 which begins the processing of the incoming cell. Network control logic 430 calculates a checksum from the first four bytes of cell header 320 and compares this value to the fifth byte, HEC 380, of header 320. If the values do not match an error has occurred in header 320 during the cell's journey from the previous node in the network. Since misdirected cells are unacceptable in an ATM network, network control logic 430 will discard the entire incoming cell.

Alternatively, the checksum may be a more complex calculation which will permit some limited correction of single-bit header errors. However, current B-ISDN standards specify correction of isolated single-bit errors and discard of burst errors. This specification can be implemented by a simple state machine as shown in de Prycker, pg. 123 or Bertsekas, pg. 134. If desired, such a state machine may be implemented in network control logic 430 by methods well known in the art.

Assuming that no errors are detected in the header or that any errors have been successfully corrected, network control logic 430 will place the first four bytes of the header in receive FIFO 440 followed by the 48 bytes of the cell's information payload. Note that no error checking is performed on the information payload. Network control logic 430 will not place the HEC 380 byte in receive FIFO 440, rather it will discard it. The HEC 380 byte is not required within the switch itself and because the switching processor normally modifies the header, a new HEC 380 byte will need to be generated when the cell is again transmitted. Therefore, the received HEC 380 byte may be discarded immediately after the integrity of the cell header is established.

In the preferred embodiment, receive FIFO 440 is a 512×32 dual port SRAM, therefore capable of storing up to thirty-nine (39) received ATM cells at any one time. Network control logic 430 may continue to place cells into receive FIFO 440 until the buffer is full, whereupon additional cells will be discarded. It should be noted that although network control logic 430, receive FIFO 440 and other port components are shown as discrete components, much of this circuitry may be placed on a single Application Specific Integrated Circuit ("ASIC").

Those skilled in the art will recognize that a wide range of FIFO sizes may be employed, some being more suitable for some implementations than others. However, currently SRAM memory is extremely expensive. Therefore, implementations requiring large SRAM buffer sizes may be too costly to be successfully installed in LAN environments. Alternative methods for handling switch congestion, such as the derailing method described below, may be employed to achieve acceptable cell loss probabilities, while still permitting small, cost-effective FIFO memories.

The placement of the first complete 52-byte cell in receive FIFO 440 will be detected by port control logic 450. Port control logic 450 will assert REQUEST 490 to request service of the queued cell by the switching architecture.

A request for service by a port 210-i initiates the entire switching operation. A switch cycle, that is, the transfer of a single ATM cell from an input port 210-i to an output port 210-j, is comprised of three distinct phases: input port selection, header processing, and cell copying which occur in that order. These phases, as will be more fully described below, operate both serially and simultaneously. For instance, as the cell copying phase of one switch cycle is being performed, the header processing phase of the next switch cycle will be occurring, and at the same time the input port of the following switch cycle is being selected. Advantageously, this arrangement yields a significant increase in switching throughput over conventional switch designs which process a single incoming cell at a time.

A request for service is processed in the following manner. As shown in FIG. 2, the ports of a cluster 150-k are conceptually divided into an lower bank 220 and an upper bank 230. REQUEST 490 is wire-ored together with request signals from the other ports belonging to the same bank to form REQUEST_LO 280 or REQUEST_UP 290. As will be illustrated below, the division of ports into separate banks permits relatively simple port identification and addressing. It will be recognized, however, that the principles of the present invention may be practiced without employing this type of port division.

Port requests for service are arbitrated by a token bus scheme managed by the token grant logic 140. Referring again to FIG. 1, all pending port requests 175, which contains REQUEST_LO 280 and REQUEST_UP 290 from all clusters 150-1 to 150-n, are examined during an active sample period. When one or more ports have asserted REQUEST 490 the token grant logic will assert a GRANT signal 180 to one of the clusters 150-k whose REQUEST_LO 280 or REQUEST_UP 290 is asserted. Within cluster 150-k GRANT 180, which represents the token, will be passed in sequence between the cluster ports 210-1 to 210-n until it is received by requesting port 210-i. This port 210-i will be granted access to the switch bus during the next switching cycle.

Upon receiving the token, port 210-i communicates an ID number to token grant logic 140. The individual ports deliver only a two bit ID number via cluster ID bus 185 which identifies the requesting port within its port bank, upper or lower. Token grant logic 140 combines this information with its knowledge of which request line generated the grant (which implicitly identifies the cluster 150-k and the port bank). Token grant logic 140 then creates an ID number unique to that port within the entire switch. Alternatively, the port may be implemented to communicate its full ID number. In the preferred embodiment, ID numbers are assigned such that lower ID values (0–15) are assigned to ports resident in lower banks, and higher values (16–31) to ports in upper banks. This arrangement, as further described below, permits all lower bank (or upper bank) ports to be selected to receive the cell in a single multicast switching operation. This ID number is placed on the switch ID bus 190 to be delivered to switch controller 120. The token grant logic 140 then delivers a switch cycle request to microprocessor 110 to notify it of the presence of a selected port with data to transfer. In the preferred embodiment, this request is performed by means of a processor interrupt, though other signalling methods may be used. For example, the processor might routinely monitor a status register.

Microprocessor 110 is, preferably, a commercially available RISC single-chip microprocessor such as the ARM610, manufactured by Advanced RISC Machines of Cambridge, England, operating at 32 MHz with a memory bus speed of 16 MHz. If the switch is in normal operation, microprocessor 110 will respond to a switch cycle request by asserting SWITCH_CYCLE_START 193 to notify switch controller 120 to initiate a switch cycle. SWITCH_CYCLE_START 193 is shown as a single signal line in FIG. 1, but a variety of methods might be employed to deliver the cycle request to switch controller 120, such as a processor signal or setting a status register bit. In the preferred embodiment microprocessor 110 actually executes a two word memory read instruction directed to a fixed address continually monitored by switch controller 120.

Although the majority of cells switched by switch 100 will be serviced almost entirely by hardware, it is important that each switch cycle be initiated under the authority of microprocessor 110 via SWITCH_CYCLE_START 193. Microprocessor 110 may frequently have to respond to signalling and management cells requiring updates to the routing tables ultimately used by switch controller 120. A switch cycle cannot be permitted to occur while these updates are in progress. Microprocessor 110 accomplishes this by simply refusing to respond to a switch cycle request until such updates are complete. This obviates the need for the complex interlocks which might be required if the switching hardware operated independently of processor control.

Switch controller 120 is a hardware coprocessor which manages the switching operation. Switch controller 120 is actually a sequential state machine which may be constructed using well-known digital design techniques using discrete logic, gate arrays, or ASICs. Preferably, however, switch controller 120 is a commercially available field programmable gate array, such as the XC4010D manufactured by Xilinx Inc. of San Jose, Calif.. Field programmable gate arrays provide the capability of modifying and updating switch controller 120 while the unit is installed within an ATM network. Such capability will be essential for the foreseeable future, as standards for ATM LAN networks have not been completely defined. The use of easily modified technology will permit users to adopt ATM LAN networks without fear of lost investment.

Both microprocessor 110 and switch controller 120 reside on the same processor bus 160. Switch controller 120 can not utilize processor bus 160 to perform switching functions while microprocessor 110 is active without encountering unacceptable bus contention. Therefore, after detecting SWITCH_CYCLE_START 193, switch controller 120 asserts PROCWAIT 195 which, tied directly to the processor wait input line of microprocessor 110, places microprocessor 110 into a wait state. Switch controller 120 also disables the processor bus, thereby eliminating any possible bus conflict difficulties.

After asserting PROCWAIT 195, switch controller 120 initiates an OLD HEADER read cycle to all switch ports. All bus cycles originated by switch controller 120, including the OLD HEADER read cycle, mimic an actual microprocessor 110 bus cycle. The nature of the instant read cycle is communicated to the ports by switch controller 120 via the assertion of the OLD_HEADER signal 492 as shown in FIG. 4. This signal, as well as NEW ROUTE 494, NEW HEADER 496 and CELL COPY 498 are generated by switch controller 120 but are not shown in FIGS. 1 and 2 for the sake of clarity. In response to OLD_HEADER 492, port control logic 450 of port 210-i which has current possession of the token will remove the cell header from the first cell in its receive FIFO and place it onto processor bus 160 (through local processor bus 250). As discussed above, the HEC 380 byte is no longer in the cell header, as it was previously removed by network control logic 430. Advantageously, the remaining four header bytes can be accessed by a single read operation on 32-bit processor bus 160.

When the cell header is present on processor bus 160 and being read by switch controller 120 the port control logic 450 of all ports will latch the header in their respective old header latch 455. This information will be used by the ports to create a new outgoing header, as further described below. At the completion of the OLD HEADER read cycle, the selected port releases the token. The token is again passed from port to port within the cluster via GRANT 180 until it reaches the next port in need of service within the cluster. Note that within a single port GRANT 180 is composed of two signals GRANT_IN 486 and GRANT_OUT 488. If no other ports require service within the cluster, token grant logic 140 will assert GRANT 180 to another cluster containing a port whose request was received during the last active sample period. That port will request a switch cycle in the same manner as described above. In this fashion, port selection for the next switch cycle is accomplished during the header processing phase of the previous cycle. If no requests remain, another sample will be taken.

Only the ports requesting service during an active sample period will be serviced. Other ports with cells which become ready after the sample period must wait until the next sample period. This imposes a form of arrival scheduling without complex logic.

Once the cell header has been latched by switch controller 120, the switch cycle enters the header processing phase. Initially, switch controller 120 performs an examination of the header value. If the header was at some point corrupted and now no longer contains a reasonable value, switch controller 120 will abort the switch cycle and discard the cell. A variety of methods of checking the header information are available and will be obvious to those of skill in the art. However, a crude integrity check on the header may be performed by verifying that the four bits of GFC 330 are set to zero. Recall that GFC 330 is defined only at the UNI and is available to help the user to statistically multiplex the cells from different applications onto the access link to the network. GFC 330 will be set to zero by the user when the cell is transmitted onto the network. If the eight bits of VPI 340 are sufficient for the network implementation, rather than the full twelve normally available in the NNI, than GFC 330 may be used for error check purposes. If switch controller 120 detects a non-zero GFC 330, then the header must have been corrupted. Switch controller 120 will generate an exception condition, as described below, requesting microprocessor 110 to assume control of the switching architecture to remove the remainder of the corrupted cell from the receive FIFO 440 of port 210-i. However, if the value appears sensible, switch controller 120 will perform some initial processing which will ultimately guide the overall course of the switch cycle.

TABLE I

| PAYLOAD TYPE BIT SETTINGS | |
| --- | --- |
| 000 | Normal data cell |
| 001 | Data cell with user data bit set |
| 010 | Normal data cell/experienced congestion |
| 011 | Data cell with user data bit set/experienced congestion |
| 100 | Segment F5 OAM (Operation and Management) cell |
| 101 | End-to-end OAM cell |
| 110 | Resource management (flow control) cell |
| 111 | Signaling cell (no defined use) |

Switch controller 120 will examine PTI 360 to determine whether the instant cell carries a normal user information field or whether the cell is a signalling or management cell intended to be received by the switch itself. The bit definitions of PTI 360 are shown above in Table I. If PTI 360 contains a value 0, 1, 2 or 3, then the cell is a normal data cell requiring a typical switching operation. Cells with values 5 or 6 are end-to-end signaling cells which will also be passed straight through. The value 7 is currently undefined, so these cells will also receive normal handling. Cells containing a PTI 360 of 4 are link level Operation and Management ("OAM") cells which require special processing by microprocessor 110. These values will result in an exception handling procedure as described below. Switch controller 120 also inspects VCI 350 to detect link level OAM cells identified by a VCI value of 3. These also require special processing by microprocessor 110, and likewise will result in an exception handling procedure.

If the header indicates that the cell requires normal switching, switch controller 120 will examine VPI 340. If VPI 340 is equal to zero, the cell is a member of a typical unbundled virtual circuit and will require ordinary switching. A non-zero VPI 340 on the other hand indicates that the cell's virtual circuit is a member of a virtual path, which should undergo virtual path switching. Performance of virtual path switching is described below.

Figure 5:
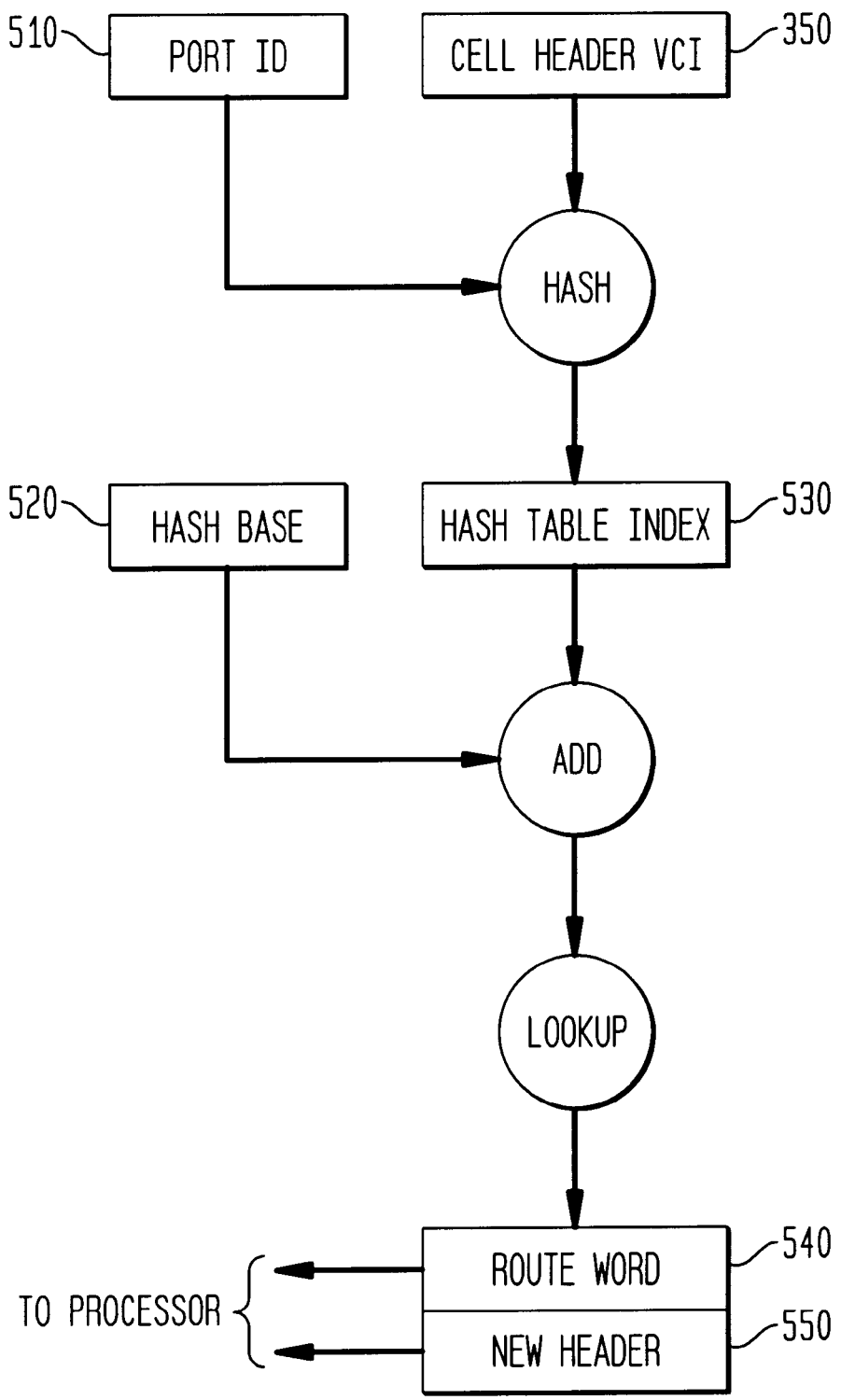
FIG. 5 is a flow diagram illustrating functions performed by the switch controller used in the ATM switch of FIG. 1 during a normal virtual circuit switching operation.

If the cell carries a normal payload and VPI 340 is zero, switch controller 120 extracts VCI 350 from the header. As shown in the flow diagram of FIG. 5, the sixteen bits of VCI 350 are hashed together with the five bits of Port ID 510 identifying the selected input port 210-i provided by token grant logic 140 via switch ID bus 190. This hash function produces a sixteen-bit routing table index 530.

Figure 6A:
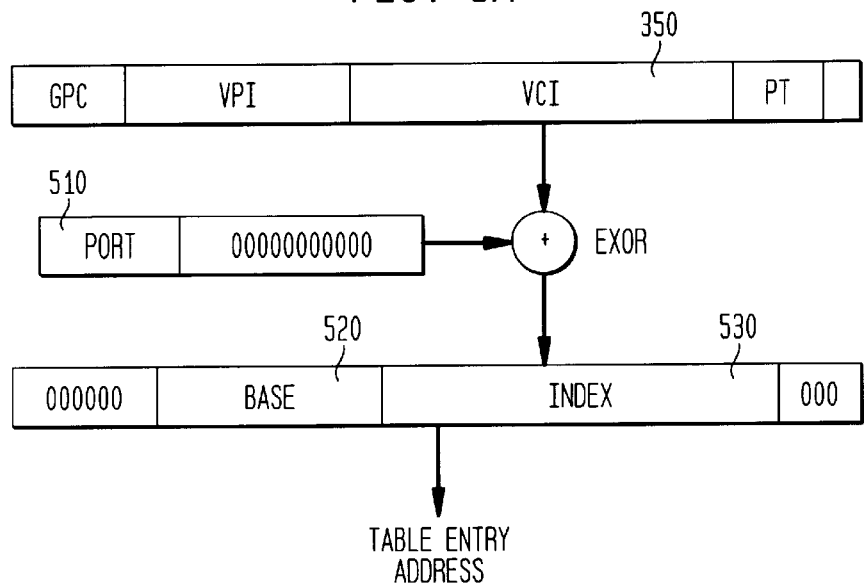
FIG. 6A is a diagram of the VCI hash function used in the ATM switch of FIG. 1.

The actual hash function used to create the routing table index is shown in FIG. 6A. The sixteen bits of VCI 350 are exclusive-ored with a sixteen bit value formed by the port ID 510 in the 5 most significant bits followed by 11 zeroed bits. The use of hash functions to generate table indexes is a well-known technique in computer science and is described in a variety of references. See, e.g., D. E. Knuth, *The Art of Computer Programming*, Vol.3, (Addison-Wesley Publishing Company, Reading, Mass., 1973) and Alfred V. Aho, John E. Hopcroft, and Jeffrey D. Ullman, *The Design and Analysis of Computer Algorithms* (Addison-Wesley Publishing Company, Reading, Mass., 1974), pp. 111–13. Those skilled in the art will recognize that the present invention is in no way limited to the use of a particular hash function, but rather that anyone of a wide variety of hash functions may be utilized.

Figure 7:
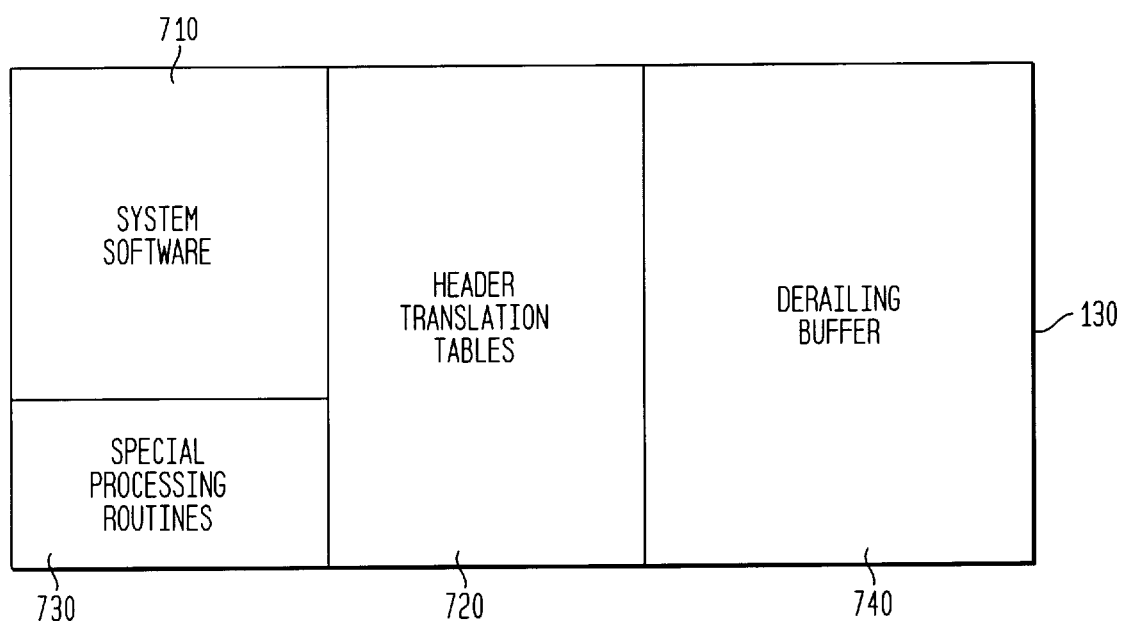
FIG. 7 is a diagram of the contents of the DRAM memory used in the ATM switch of FIG. 1.

In order to perform the cell header translation required in all ATM switches, a routing table is needed which maps the incoming port and header values to outgoing port and header values. As shown in FIG. 7, the routing table 720 of the present invention is stored in DRAM memory 130. DRAM memory 130 also contains the basic switch operating software 710 executed by microprocessor 110, and special processing routines 730 and derail buffer 740, whose respective functions will be described below.

The base address 520 in DRAM 130 of routing table 720 is added to the routing table index 530 generated by the hash function to produce a specific address within routing table 720. Switch controller 120 initiates a two word memory read at this address which obtains two distinct values: the Route Word 540 and the New Header Word 550. These values will have been placed in routing table 720 previously by microprocessor 110 when the virtual circuit corresponding to the instant cell was initially established.

One of the principal motivations behind employing a hash-based routing table is the efficient use of table memory. To fully comprehend the benefits of hash indexing, the establishment and management of routing table 720 at connection set-up time must be examined.

As mentioned above, ATM is a connection-oriented technology. When an end node wants to communicate with another end node, it requests a connection to a destination node by transmitting a signalling request to the network. The request is passed through the network, that is, through the ATM switches, until it reaches the destination node. If the destination and the network nodes all agree that sufficient bandwidth is available to maintain the connection, a virtual circuit will be formed.

When the connection is being established each switch must create an entry in its local routing table 720 which contains the information necessary to identify a cell as belonging to the virtual circuit and the information necessary to modify the headers of cells of that virtual circuit passing through the switch. This includes, at a minimum, the incoming port number, incoming VCI/VPI, outgoing port number, and outgoing VCI/VPI. The VCI/VPI values only have local significance. The switch will choose the incoming VCI/VPI and provide the previous switch in the circuit with that information; the outgoing VCI/VPI will be provided by the next node in the network.

One of the major disadvantages of conventional ATM switches is the need to maintain a large routing table for each port of the switch. Normally, however, most ports of an ATM switch will only service a small number of virtual circuits at any one instant in time, while a few ports will handle a large volume of different traffic. Each table must be large enough to accommodate the significant number of circuits which may be present at any one time on any one port, but this memory will be left idle during much of the switch operation. This is a very inefficient use of memory, which can be the most costly component of the switch.

In the present invention, however, switch controller 120 indexes the routing table using a hash function, thus permitting the use of a smaller shared routing table. If only low VCI values are used, the index will be into a small logical routing table dedicated to that input port. In the preferred embodiment, this logical routing table contains enough table space to specify 2048 virtual circuits. However, if a larger range of VCI values is used, or if VPIs are used, switch controller 120 permits the logical routing tables for different ports to share memory in a controlled way.

When the virtual circuit connection is established, the signalling software executed by microprocessor 110 will select an initial VCI (or VPI) value. Microprocessor 110 will check to see if the hash function, using that VCI and the input port ID, would generate an index pointing to a location in routing table not currently used by another virtual circuit. If the table location is currently occupied, the VCI value will be changed to a value which, when input to the hash function, will generate an index which will point to a free location. This VCI value will be transmitted to the previous node on the virtual circuit with instructions to place it in the outgoing cell headers. In this fashion the routing table memory may be shared, eliminating the need for large, under-utilized memories.

Although hash-table allocation is performed locally in the preferred embodiment, it will be recognized by those of ordinary skill in the art that such allocation may be performed remotely by a centralized network signalling processor. In this configuration, allocation information will be transmitted to the switch via signalling and management cells by the central processor itself.

Figure 8:
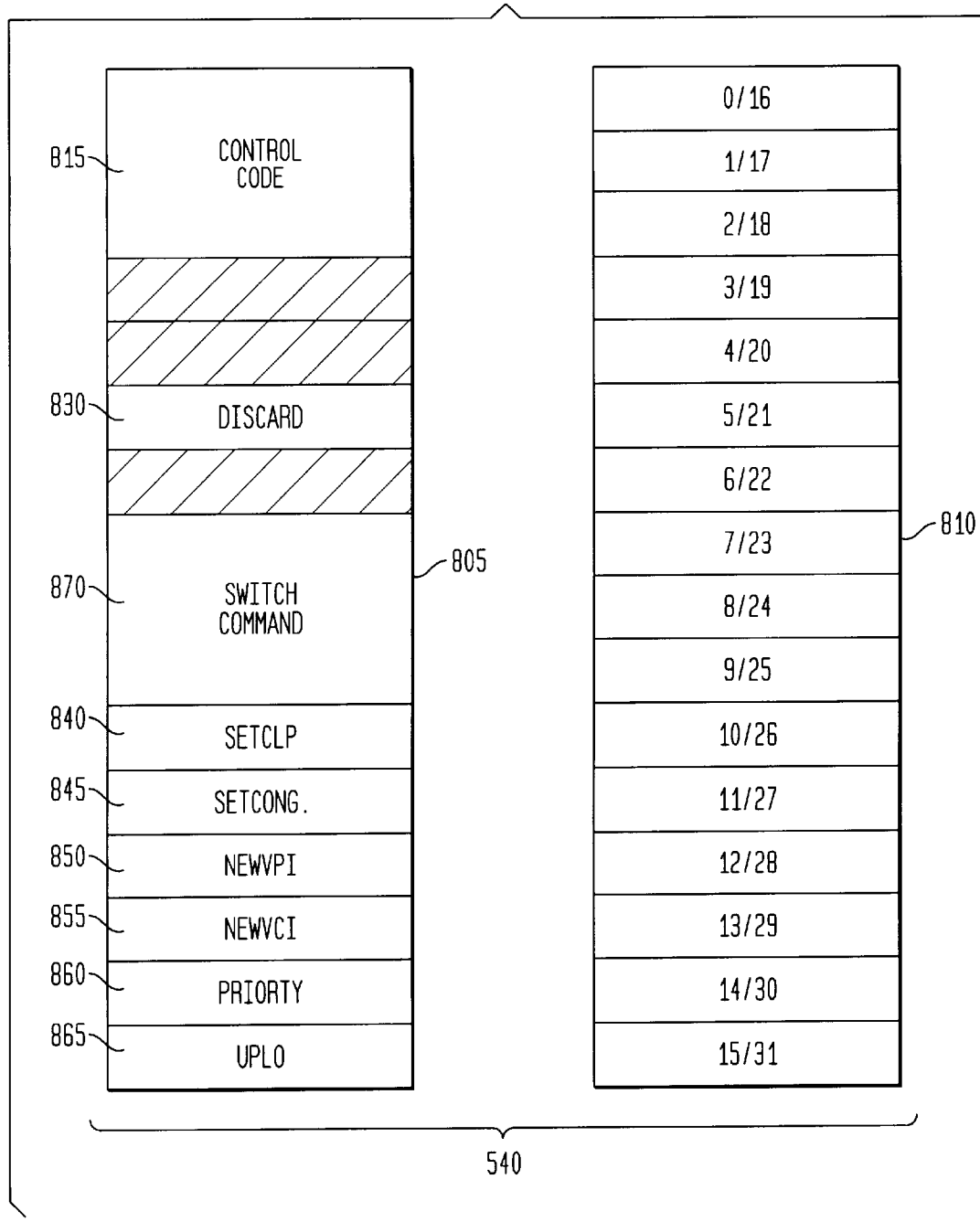
FIG. 8 is a diagram of the contents of the Route Word shown in FIG. 5.

The Route Word is the principal vehicle by which information concerning the proper flow of the switch cycle is communicated to microprocessor 110 and ports 210-1 to 210-n. As shown in FIG. 8, Route Word 540 is a 32-bit word conceptually separated into two 16-bit portions. The lower 16-bit portion 805 contains a variety of control information which direct the proper handing of the instant cell, whereas the upper 16-bit portion 810 provides a mechanism for identifying the proper output port or ports 210-j to receive the cell being switched.

At this point the Route Word 540 and the New Header Word 550 are delivered to microprocessor 110. Recall that microprocessor 110 initiated the switch cycle by executing a two word memory read at a fixed address. Switch controller 120 will release microprocessor 110 from the wait state by removing PROCWAIT 195. As microprocessor 110 completes this read cycle, switch controller 120 generates memory cycles which place the Route Word 540 and New Header Word 550 onto processor bus 160 so that microprocessor 110 receives these values as a result of the read operation.

Microprocessor 110 will examine the Route Word to determine if special processing during this switch cycle is required. Specifically, microprocessor 110 will inspect CONTROL CODE 815 contained in the first three bits of Route Word 540 as shown in FIG. 8. The possible values of CONTROL CODE and their respective meanings, as employed in the preferred embodiment, are shown below in Table II.

TABLE II

CONTROL CODE BIT SETTINGS

| BIT 2-0 | OPERATION |
| --- | --- |
| 0 0 0 | Exception, Count Cell |
| 0 0 1 | Exception |
| 0 1 0 | Normal Switch Cycle, Count Cell |
| 0 1 1 | Normal Switch Cycle |
| 1 0 0 | Derail Cell, Count Cell |
| 1 0 1 | Derail Cell |
| 1 1 0 | — |
| 1 1 1 | — |

In a normal switch cycle CONTROL CODE 815 will be set to '011' indicating that no special processing by microprocessor 110 need be performed. The other possible values of CONTROL CODE 815 specify special functions, the processing of which will be described in detail below.

Switch controller 120 inspects the SWITCH COMMAND field 870 of Route Word 540 to determine the action it needs to take during the switch cycle. The possible values of SWITCH COMMAND and their respective meanings, as employed in the preferred embodiment, are shown below in Table III.

TABLE III

SWITCH COMMAND BIT SETTINGS

| BITS 9-7 | OPERATION |
| --- | --- |
| 0 0 0 | Do Nothing |
| 0 0 1 | Rehash |
| 0 1 0 | Indirect |
| 0 1 1 | Extend |
| 1 0 0 | Go (Normal Switch Cycle) |
| 1 0 1 | Escape 1 |
| 1 1 0 | Escape 2 |
| 1 1 1 | Escape 3 |

Value 'Go' indicates a normal switch cycle. Value 'Do Nothing' is used when the cell will be processed entirely by the software, and instructs switch controller 120 to take no further action after delivering Route Word 540 and New Header Word 550 to microprocessor 110. Such an instance may occur when a cell is received that is destined for the switch itself, as described below. Other values indicate that special action is required by switch controller 120, and are described in more detail below.

When switch controller 120 reads Route Word 540 from routing table 720 all ports 210 except the current input port 210-i also read Route Word 540 by latching it from processor bus 160 (through local processor bus 250) into their respective Route Word Latch 457. Switch controller 120 identifies the presence of Route Word 540 on processor bus 160 by asserting NEW ROUTE signal 494. The ports read Route Word 540 simultaneously with switch controller 120 to eliminate the need for a separate bus cycle to deliver the information of Route Word 540 to the ports. As with the simultaneous reading of the Old Header, this arrangement has the advantage of significantly increasing the speed of the switching cycle.

Each port examines Route Word 540 to determine whether it is the intended recipient of the cell being switched. As shown in FIG. 8, the bits of the upper 16-bits 810 of Route Word 540 indicate which output port 210-j should receive the cell. A port will recognize that it is the intended output port 210-j when it sees its corresponding bit set. Ports resident in the lower banks of each cluster are addressed when UpLo 865 of the lower portion 805 of the word, also shown in FIG. 8, is zero, whereas the ports in the upper banks are addressed when UpLo 865 is one. The selected output port 210-j will use the remaining bits of the lower portion 805 of Route Word 540 to determine the proper disposition of the New Header Word 550 and the cell payload.

When the New Header Word 550 is read onto processor bus 160 by switch controller 120, only port 210-j selected by Route Word 540 to be the output port will latch the New Header Word 550 into its New Header Latch 459. Switch controller 120 identifies the presence of the New Header Word 550 on processor bus 160 by asserting NEW HEADER signal 496. The format of New Header Word 550 is identical to the standard ATM cell header format depicted in FIGS. 3B and 3C. Port control logic 450 will use the field values in the New Header Word 550 to modify the Old Header stored in old header latch 455 to construct the proper new header for the outgoing cell. Specifically, port control logic 450 will examine the fields New VPI 850 and New VCI 855 in Route Word 540 to make the proper substitutions. If one of these bits is set then port control logic will substitute the corresponding new value of that field in the New Header Word 550 in the outgoing header. For example, if New VCI 855 is set, then the VCI 350 in the New Header Word 550 will be used in the outgoing header, while all other fields will remain identical to those in the old header. Set CONG 845 flag instructs the port control logic 450 to translate the PTI 360 field of the outgoing cell to mark the cell as having experienced congestion as shown in Table I. Likewise, the Set CLP 840 flag instructs port control logic 450 to set CLP 370 in the outgoing cell.

The issuance of the Route Word 540 and New Header Word 550 to microprocessor 110 completes the header processing phase of the switch cycle. At this point, assuming no errors or conditions requiring microprocessor intervention have been detected, and SWITCH COMMAND 870 contains the Go command, switch controller 120 will initiate the cell copying process by asserting CELL COPY signal 498. In response to this signal the selected input port 210-i will place the twelve words of the cell payload onto switch bus 170 in a sequential fashion. The selected output port 210-j will read the twelve words from switch bus 170, concatenate those words with the new header which it has constructed and place the complete cell into the proper transmit FIFO, as described below. As cell copying is being performed along switch bus 170 (and/or local switch bus 240), the header processing phase of the next switch cycle will begin utilizing processor bus 160.

Two transmit FIFOs 480, 485 are employed in each port 210, rather than the typical single FIFO, to achieve a simple form of prioritization of transmission. FIFO 480 is the high-priority, or real-time, queue, whereas FIFO 485 is the low priority, or non-real-time, queue. Cells travelling on high quality of service virtual circuits, such as circuits carrying multimedia video and audio streams, may be placed into the high-priority transmit FIFO 480 to await transmission, while cells on circuits with less stringent timing requirements may be placed in the low-priority FIFO 485. The determination of which queue should be used for a particular virtual circuit is made at connection set-up time.

In the preferred embodiment, each transmit FIFO 480, 485 is a 256×32 dual port SRAM, each capable of storing nineteen (19) complete ATM cells. Therefore, a maximum of thirty-eight (38) cells may be queued for transmission within a single port 210 at any one time. Of course, as with the input FIFOs 440 a wide range of buffer sizes may be employed, and if other overflow handling methods are not implemented larger queue sizes will be required to achieve acceptable cell loss probabilities, but at a significant component cost.

Port control logic 450 of output port 210-j determines which transmit FIFO to place the outgoing cell by examining the Priority bit 860 of Route Word 540. If Priority 860 is one, then the cell will be placed in the high-priority FIFO 480, otherwise the cell is placed in the low-priority FIFO 485. Output port 210-j will transmit all cells residing in the high-priority FIFO 480 before it transmits any from the low-priority FIFO 485. In this fashion, more urgent traffic is serviced in a more timely manner. Those skilled in the art will recognize that this is not the only selection scheme and that other mechanisms can be implemented. For instance, a better utilization of the available buffer space can be made by alternately servicing both FIFOs until high-priority fifo 480 reaches some predefined level of occupancy, whereupon high-priority FIFO 480 is then serviced exclusively.

Once at least one cell resides in one of the transmit FIFOs 480, 485, network control logic 430 will begin transmission of that cell onto the outgoing network link 400. Network control logic 430 will deliver the cell to line interface 405 beginning with the first four bytes constituting the cell header. Network control logic 430 will calculate an appropriate checksum for these first four bytes and will transmit that error check byte, HEC 380, as the fifth byte of the cell transmission. The remaining 48 bytes of the cell constituting the cell payload will then be transmitted. Once the complete cell is transmitted by the line interface, the switching operation regarding that specific cell is complete.

Advantageously, switch controller 120 can accomplish virtual path switching as easily as virtual circuit switching. A virtual path is a collection of separate virtual circuits of the same quality of service which are travelling along the same route for at least part of their journey. A virtual path is specified by a non-zero value in VPI 340 of a cell header 320, as shown in FIG. 3. Because switching on a single VPI 340 value can switch cells from a large number of virtual circuits, routing table sizes in DRAM 130 can be kept relatively small. Combining virtual circuits into a single virtual path is called encapsulation.

Figure 9:
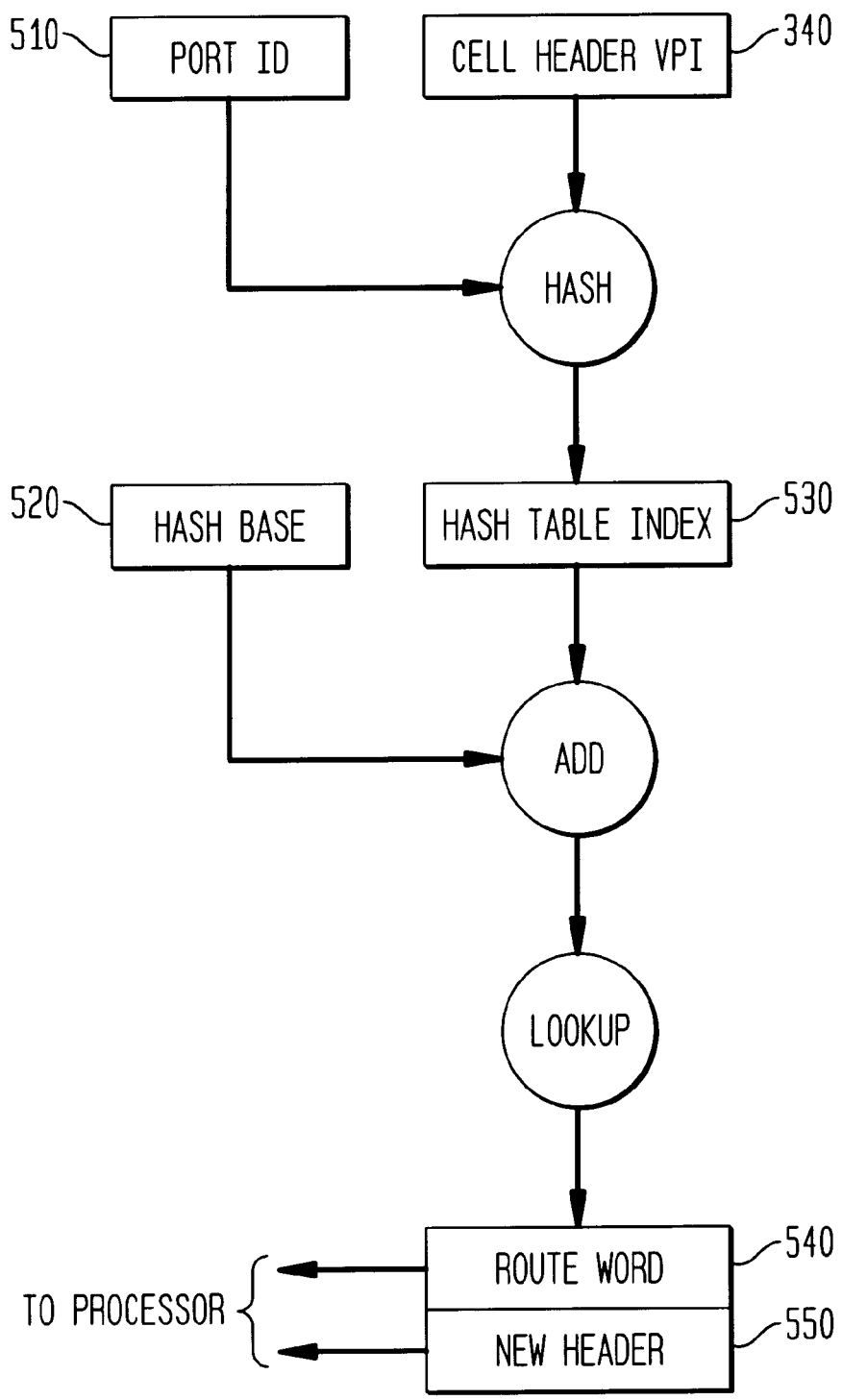
FIG. 9 is a flow diagram illustrating functions performed by the switch controller used in the ATM switch of FIG. 1 during a normal virtual path switching operation.

A cell belonging to a virtual path is switched by switch controller 120 in the same manner an ordinary cell is switched. However, switch controller 120 will detect the non-zero VPI 340 in the cell header 320, and use that value rather than the value of VCI 350 to create the routing table index. As shown in the flow diagram of FIG. 9, switch controller 120 will hash the eight bits of VPI 340 with the five bits of Port ID 510 identifying the selected input port 210-i provided by token grant logic 140. This hash function will generate a sixteen-bit routing table index 530.

Figure 6B:
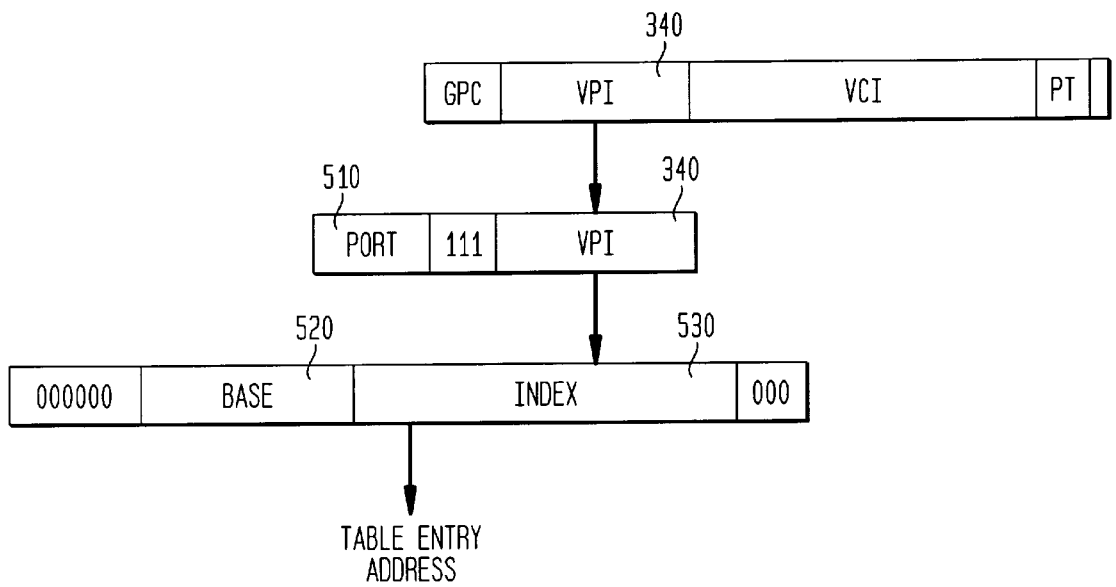
FIG. 6B is a diagram of the VPI hash function used in the ATM switch of FIG. 1.

As shown in FIG. 6B, however, a separate hash function is employed when switching on the VPI 340. In this hash function, the sixteen-bit index is directly created by placing the port ID 510 value in the 5 most significant bits, setting the next three bits to one, and placing the VPI 340 value in the lower eight bits. Note that an alternate hash function will be required if twelve-bit VPI standard of the NNI is employed. The base address 520 of the routing table is added to the table index 530 to produce a specific address within the routing table. Note that by using a hash-based method, in contrast to conventional ATM switches, VPIs and VCIs can be maintained within the same routing table thereby conserving memory space. As in a VCI switching operation, switch controller 120 initiates a two word memory read at this address to obtain the Route Word 540 and the New Header Word 550. The remainder of the switch cycle will occur in precisely the same way as an ordinary switch cycle.

A more complicated operation will occur when switch 100 must perform virtual path de-encapsulation. A virtual path will need to be broken into its constituent virtual circuits when it reaches its end point. Although each cell belonging to the virtual path will arrive at the switch with a non-zero VPI 340, switch controller 120 must recognize that the virtual path is at its end and switch on the VCI 350 value instead.

Figure 10:
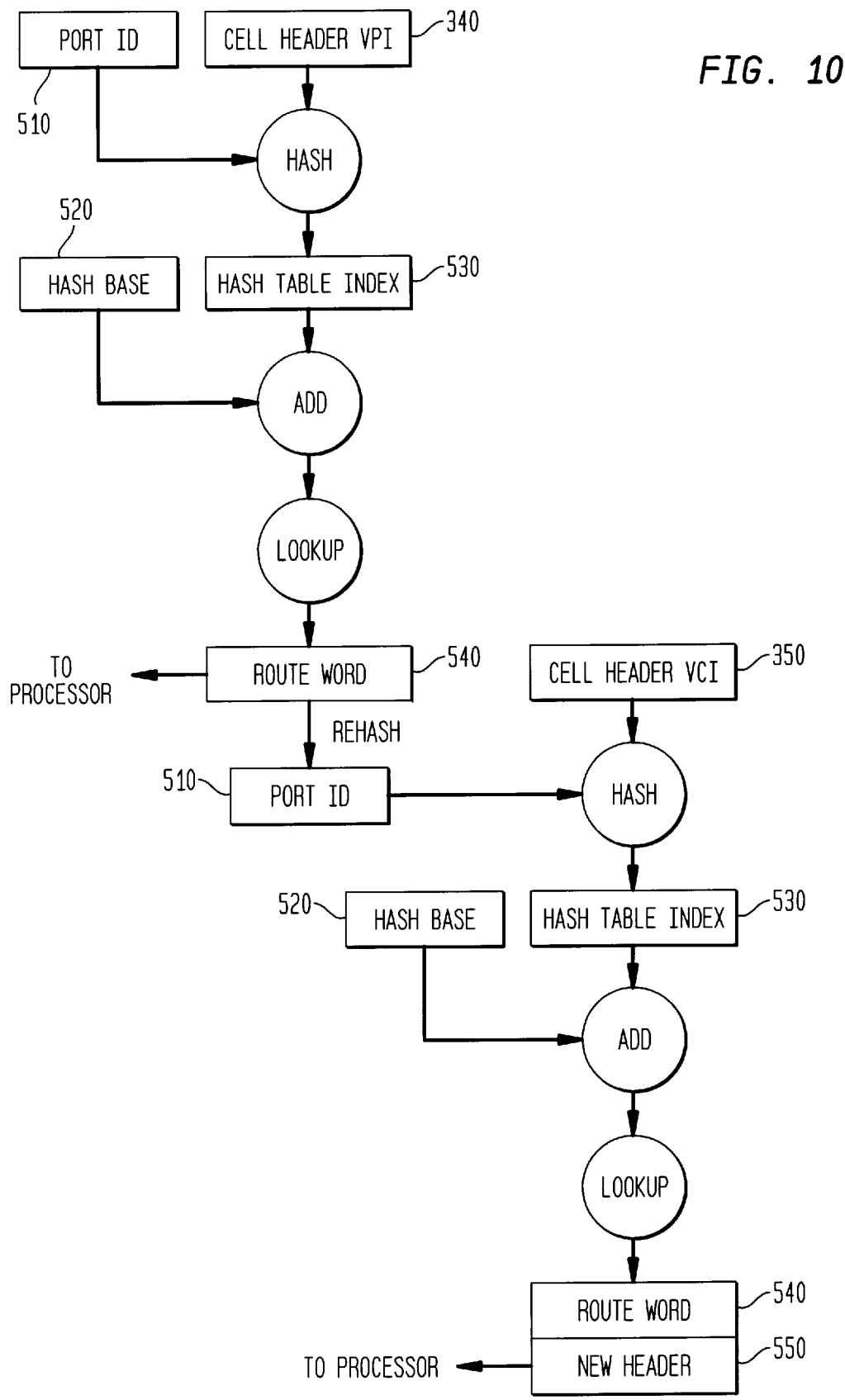
FIG. 10 is a flow diagram illustrating functions performed by the switch controller used in the ATM switch of FIG. 1 during a virtual path de-encapsulation switching operation.

The flow diagram of FIG. 10 illustrates this operation. As before, VPI 340 is hashed with the port ID 510 to obtain a table index 530 used to retrieve the Route Word 540. The SWITCH COMMAND field 870 of Route Word 540 will be set to the Rehash command as specified in Table III, indicating to switch controller 120 that a second hashing operation must be performed. Note that New Header Word 550 is not shown at this point in the flow diagram of FIG. 10. Although switch controller 120 will execute a two word memory read, the second word obtained will have no sensible value. Upon detecting the Rehash command in SWITCH COMMAND 870 switch controller 120 will extract the VCI 350 from the cell header 320 and hash it together with the port ID 510 according to the hashing function of FIG. 6A. The resulting table index 530 will be used to obtain a new Route Word 540 and New Header Word 550. The remainder of the switch cycle will occur in the same manner as an ordinary switch cycle.

Multicast virtual circuits are desired to support multimedia applications. For example, a videoconferencing transmission may need to be delivered to several end destinations which are participating in the videoconference. The architecture of the present invention handles multicast virtual circuits very efficiently without the need for multiple cell copies often required by prior art switches.

At least two basic scenarios are possible in a multicast switching operation. In the simplest situation each outgoing cell will have the same new header and the intended output ports will all be in the lower port bank or all in the upper port bank and will use the same priority FIFO. In this case, the switch cycle occurs in precisely the same manner as the basic switch cycle, as shown in the flow diagram of FIG. 5. However, rather than a single bit being set in the upper portion 810 of Route Word 540, a bit will be set for each output port which should receive the cell. Because ports in the upper and lower banks must be addressed by separate Route Words 540 (with alternate UpLo 865 settings), this simple form of multicast can only be performed when all intended output ports reside in the same bank.

Each intended output port 210-j will recognize its corresponding bit set in Route Word 540 after switch controller 120 reads it onto the processor bus 160. Each selected output port 210-j will read the following New Header Word 550 to construct a new cell header from the saved old header. Because a single New Header Word 550 is being utilized, all selected output ports 210-j will create identical new cell headers. Switch controller 120 will assert CELL COPY 498, the selected input port 210-i will place the cell payload onto switch bus 170, and each selected output port 210-j will simultaneously read the cell payload, add the cell header, and place the cell in the appropriate transmit FIFO.

Because VCI/VPI values have only local link-to-link significance, however, a situation where all outgoing cells in a multicast transmission possess the same header, although common, will not always occur. Often, each outgoing cell will have an unique header which must be individually constructed during the switching procedure. Simply setting additional bits in Route Word 540 will not be sufficient to perform the typical multicast operation. Also, as mentioned above, a more complex switch cycle will be required if the intended output ports occupy both the lower and upper banks, even if all outgoing cells share an identical new header.

Figure 11:
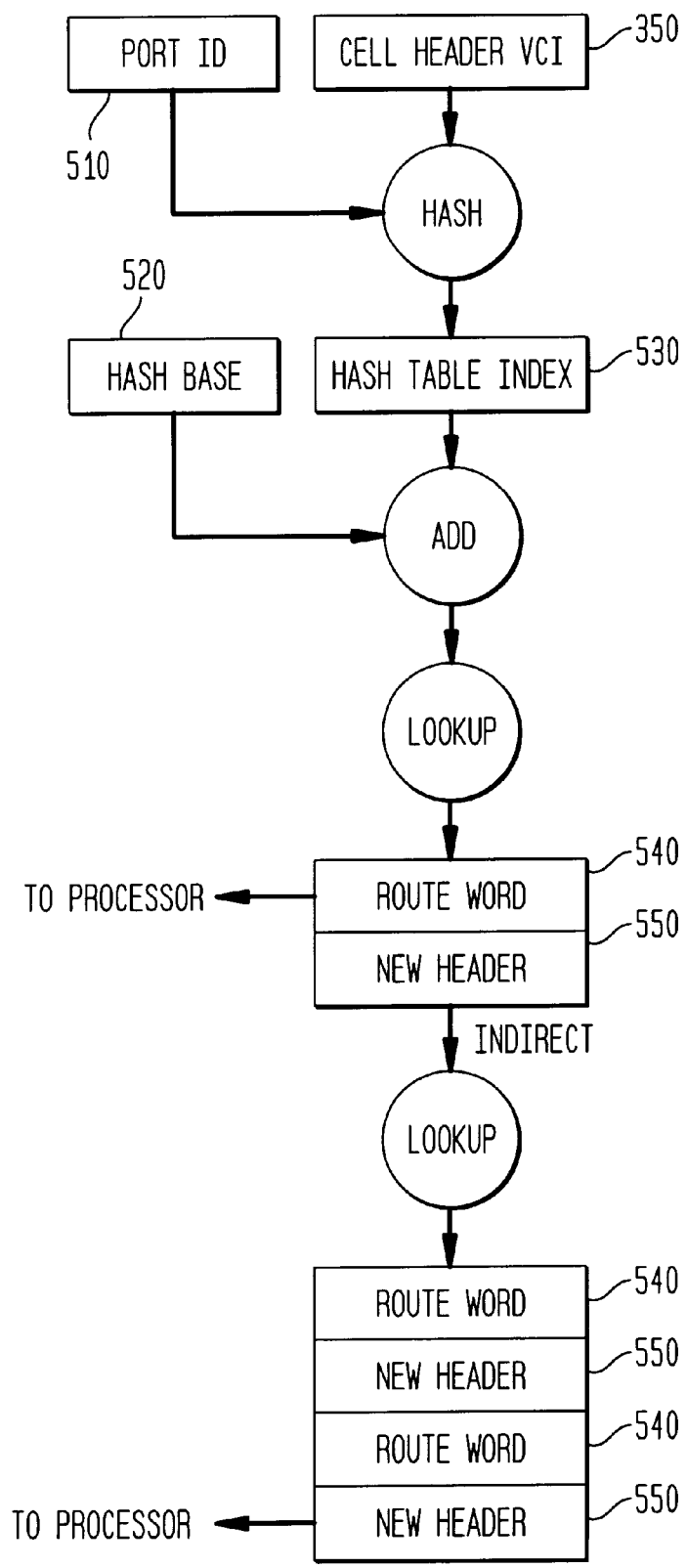
FIG. 11 is a flow diagram illustrating functions performed by the switch controller used in the ATM switch of FIG. 1 during a typical multicast switching operation.

Switch controller 120 handles this situation by performing an extended routing table look-up sequence as depicted in the flow diagram of FIG. 11. During a typical multicast switching operation, the Route Word 540 read after the first hashing operation has been performed will have its SWITCH COMMAND field 870 set to Indirect as specified in Table III. The Indirect command indicates to switch controller 120 that the subsequent word is not a typical New Header Word 550 containing an ATM cell header, but rather an index to an auxiliary portion of routing table 720 which contains the Route Words 540 and corresponding New Header Words 550 for each output port 210-j involved in the current multicast transmission. Switch controller 120 will execute a two word memory read at the address specified in that word to obtain a new Route Word 540 and New Header Word 550.

This Route Word 540 will specify the output port or ports 210-j which should use the header information in the corresponding New Header Word 550. It will often be the case in a multicast operation that some of the outgoing ports will use the same cell header. (For example, if the same VCI is used for both directions of a circuit, then it follows that each branch of a multicast will use the same VCI.) To conserve table space, only one Route Word 540 and New Header Word 550 need be used for each unique outgoing header among the lower or upper bank of ports. Of course, a single Route Word 540 can only be used to address one bank of ports, upper or lower, simultaneously. In the situation where more than one output port will share the same header, as before, more than one bit will be set in the upper portion 810 of the Route Word 540. As switch controller 120 reads Route Word 540 and New Header Word 550 onto processor bus 160, each selected output port 210-j will read and store the information.

If SWITCH COMMAND 870 in that Route Word 540 was set to the Extend command as specified in Table III, then switch controller 120 will execute another two word memory read at the next sequential location in DRAM 130 to obtain another Route Word 540 and New Header Word 550 pair. These values will be processed as before, though those output ports 210-j which were selected earlier will ignore the presence of this information on processor bus 160. Switch controller 120 will continue delivering Route Words 540 and New Header Words 550 to the ports until the last Route Word 540 it delivered did not have the Extend command set in SWITCH COMMAND 870, indicating that switch controller 120 has already processed the last Route Word/New Header Word pair.

At this point, assuming no exception conditions, switch controller 120 will assert CELL COPY 498 causing the cell payload data to be placed on switch bus 170 and read by each selected output port 210-j. The respective cell headers will be added to the payload and each cell will be placed in the appropriate transmit FIFO. In this fashion, a multicast transmission is accomplished with only a slightly extended switch cycle. The time consuming additional cell copies required by many prior art switches are avoided.

As mentioned above, switch controller 120 will detect errors or other exception conditions that may occur during a switch cycle. For example, the header value may be corrupted, the payload type or VCI may reveal the cell to be a signalling or management cell intended for the switch itself, or there may be no received cells to switch. Exceptions for particular virtual circuits may intentionally be triggered by microprocessor 110 by setting the SWITCH COMMAND field 870 of Route Word 540 to Escape 1, Escape 2, or Escape 3 as specified in Table III. In these situations, microprocessor 110 must assume control of the switching architecture to resolve the condition after receiving the Route and New Header words.

Figure 12:
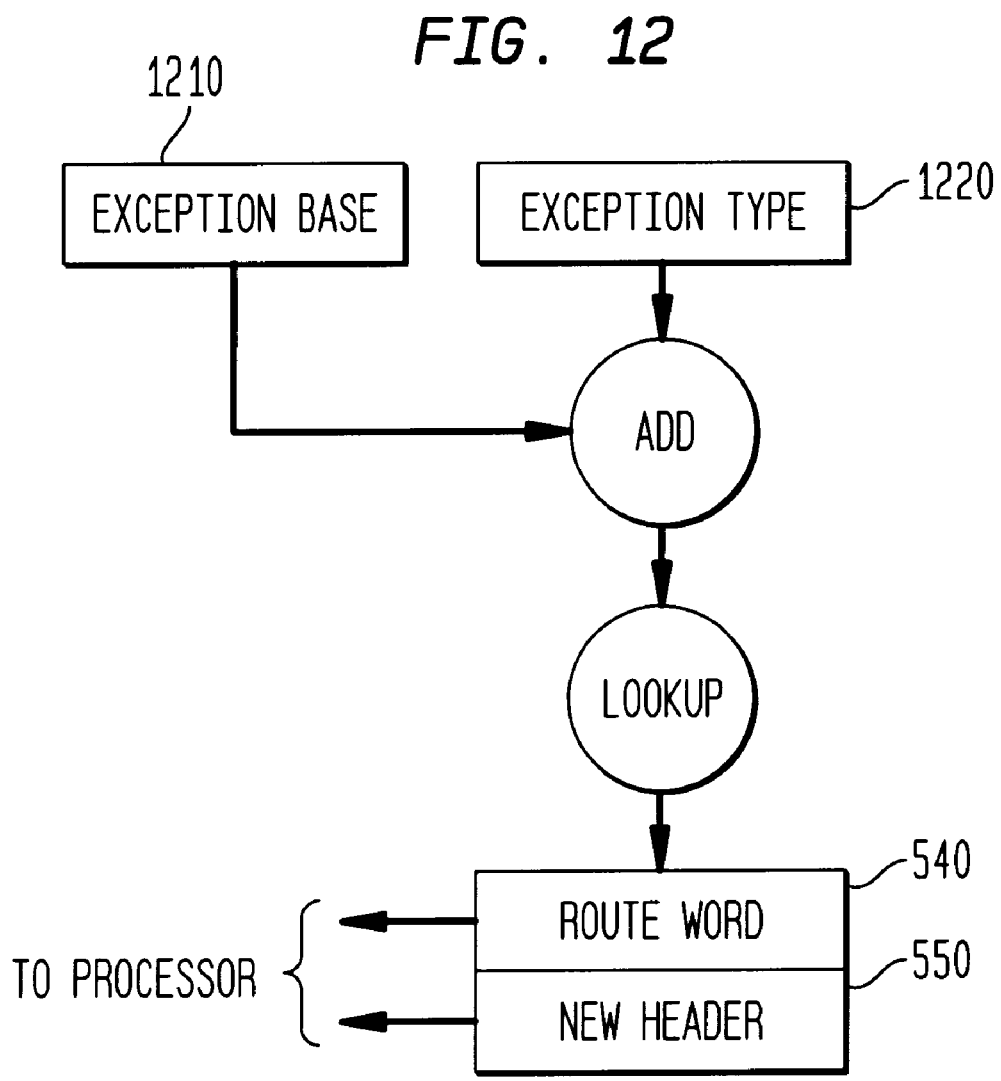
FIG. 12 is a flow diagram illustrating functions performed by the switch controller used in the ATM switch of FIG. 1 during an exception handling operation.

Upon detecting an exception condition, switch controller 120 will add an exception type number 1220, corresponding to the detected condition as shown in Table IV below, to a base address 1210 in DRAM 130 specifying the start of an Exception Table contained within the routing table 720. This process is illustrated in the flow diagram of FIG. 12. As in any switching operation, switch controller 120 will execute a two word read operation directed to the resulting address to obtain a Route Word 540 and a New Header Word 550. These values will be passed to microprocessor 110 in normal course.

TABLE IV

EXCEPTION TABLE

| ENTRY | EXCEPTION |
|---|---|
| 0 | Copy Abort |
| 1 | Idle |
| 2 | Payload Type = 4 |
| 3 | GFC bits non-zero |
| 4 | Software Escape 1 |
| 5 | Software Escape 2 |
| 6 | Software Escape 3 |
| 7 | VCI = 3 |

In this situation, however, CONTROL CODE 815 will be set to indicate an Exception condition as specified in Table II. This will indicate to microprocessor 110 that the accompanying New Header Word 550 actually contains a DRAM 130 address in the Special Processing Routines area 730. Microprocessor 110 will jump to that address to execute a special software routine contained at that location. A separate routine will exist for each possible exception condition, each routine intended to resolve its corresponding exception condition.

A special exception condition, IDLE, is detected by switch controller 120 when a switch cycle request has been issued by microprocessor 110 when there are no cells to process. This exception is used to break the software control loop of microprocessor 110 without the need for microprocessor 110 to test for an end condition each time around the loop. Switch controller 120 generates an address to the IDLE entry in the exception table. The rest of the cycle proceeds as any other exception condition.

Normally, cells are switched entirely by the hardware switch controller 120. This full hardware processing enables the switch to achieve very high cell throughput. However, a hardware implementation permits little flexibility. For instance, it may be desired to perform special processing of a particular stream of cells, such as traffic policing, shaping, or gateway translation. Such functions have been previously available only in switches employing a software architecture, and at the significant cost of switch throughput.

The present invention eliminates this tradeoff by not limiting the use of a jump address to exception conditions which are caused by errors, but rather permitting an exception condition to be employed whenever any additional processing is desired. For instance, by setting one of the Software Escape codes in SWITCH COMMAND 870 in an ordinary Route Word 540, and by setting the corresponding entry in the Exception Table to contain both a Route Word 540 with an exception CONTROL CODE 815 and a New Header Word 550 with a jump address, microprocessor 110 can be made to handle through software the switching of all cells traveling on that virtual circuit. The jump address must specify the location of a special processing routine which contains the necessary instructions for proper switching of those cells and whatever additional processing may be required. The use of three different Software Escapes allows the definition of different functions for a particular virtual circuit. This provides a convenient mechanism to monitor and manage certain virtual circuits to perform functions tailored to particular traffic streams. Because only those cells requiring the special processing are actually switched in software, switch performance is only degraded to the extent necessary to perform the necessary functions. Ordinary cells will still receive full hardware switching.

This mechanism may also be employed to process received cells that are intended for the switch itself. Situations may arise where it is desirable for a switch to act as an end station in order to receive cells from other network members, for example, for implementation of signalling protocols or communication with a centralized network management processor. Received cells are indicated by a "Do Nothing" setting in Route Word 540 and are passed to microprocessor 110 for processing. Microprocessor 110, while acting as an end station, can also transmit cells by constructing a cell and placing it in a selected output buffer. Many prior art systems require a dedicated switch port for reception and transmission of cells to enable the switch to act as an end station.

Of course, there are some special, but commonly required, functions which do not require the overhead inherent in performing a full software switching operation. These simpler functions may be specified by employing other bit patterns in the existing Route Word 540. For instance, counting of cells of a single virtual circuit may be performed by specifying a Count Cell code in CONTROL CODE 815 as shown in Table II. In this situation, the Route Word 540 and New Header Word 550 are valid words defining the correct output port and new header translation. However, when microprocessor 110 inspects these values and detects the Count Cell condition, it will use the routing table index as an index to a count table. A cell count corresponding to the current virtual circuit will be incremented. Meanwhile, switch controller 120 may assert CELL COPY 498 resulting in normal hardware completion of the switch cycle (unless the cycle is an exception cycle).

Unlike other networking technologies, conventional ATM networks do not absolutely guarantee that each and every cell submitted to the network will arrive at its intended destination. In times of severe network congestion, cells may be discarded. However, in order for the network to provide reliable service occurrences of cell loss must be kept to an acceptably low level. Therefore, strategies for handling congestion and cell overflow are essential in the design of any ATM switch.

One of the simplest methods of reducing the probability of cell loss is the use of large input or output memory buffers, the size of which is calculated to be sufficient to buffer a transmission burst under worst case congestion conditions. However, as mentioned above, the FIFO memories employed in the present invention have actually been reduced in size to produce an affordable switch. Therefore, alternative overflow handling strategies must be employed.

Switch 100 handles buffer overflows by reserving a portion of memory in DRAM 130 for a shared overflow buffer memory 740 called the derail buffer, as shown in FIG. 7. Cells from cell streams presenting overflow conditions are "derailed", or removed, from the principal switch path and placed into derail buffer 740. The cells remain in derail buffer 740 until the overflow situation subsides whereupon they are removed and delivered to their respective output ports to await transmission.

The derailing mechanism operates in the following way. If, after switch controller 120 has delivered a Route Word 540 to the ports, it is determined by a selected output port 210-j that the appropriate transmit FIFO for which the cell is intended is already full, the output port will assert the COPY ABORT signal 470. COPY ABORT 470 is delivered to switch controller 120, but is not shown on FIGS. 1 and 2 for the sake of clarity. Upon detecting COPY ABORT 470 switch controller 120 will complete the switch cycle by returning Route Word 540 and New Header Word 550 to microprocessor 110. However, switch controller 120 will not assert CELL COPY 498 so the copying phase will not be entered. Microprocessor 110 will begin a new switch cycle which switch controller 120 will convert automatically to an exception handling cycle. A Route Word 540 requesting intervention, via the Derail Cell code in CONTROL CODE 815, by microprocessor 110 and an New Header Word 550 containing the address for the software routine to handle a derailing operation will be passed to microprocessor 110.

At this point microprocessor 110 will assume control of the switching architecture. Microprocessor 110 will copy the cell payload from currently selected input port 210-i into the derail buffer 740 which is organized as a circular buffer. As derailing must be as fast as possible switch controller 120 assists by providing a register containing the proper outgoing header calculated from the old header and original New Header and Route Words. Microprocessor 110 will attach this cell header to the payload at the back of the circular buffer in derail buffer 740, along with an additional word specifying the appropriate output port 210-j (which will be the port which generated COPY ABORT 470) and the appropriate priority transmit FIFO, information also provided by switch controller 120. Copying of the cell may be performed by DMA transfer, but use of a full DMA controller is not recommended. Setting up such a controller for a limited data transfer would introduce significant overhead. DMA-like transfers where the data moves point to point without passing through processor registers, but still requiring some processor intervention is a more suitable implementation.

Since the order of transmission of cells must always be maintained in an ATM network, subsequent cells from the same virtual circuit must also be derailed. Microprocessor 110 accomplishes this by modifying the routing table 720 entry corresponding to the virtual circuit in DRAM 130. This modification will cause switch controller 120 to automatically generate an exception condition when subsequent cells on that virtual circuit are switched. In the same manner as described above, microprocessor 110 will also move those cells to derail buffer 740, rather than to the appropriate output port FIFO.

More than one virtual circuit may encounter an overflow condition in an output port FIFO. It is permissible to derail cells from a variety of virtual circuits into derail buffer 740, as long as the order within a single virtual circuit is not disturbed.

However, multicast cells generally will not be derailed because of complexity required to handle such a derailing operation does not merit its use. Therefore, the Route Word 540 corresponding to a multicast cell will have its Discard bit 830 set. Discard 830 instructs a selected output port 210-j with a full output FIFO to simply discard the new cell rather than asserting COPY ABORT 470. In this manner, the other members of the multicast transmission will proceed normally. For example, if a multicast cell is intended for transmission to three ports, one of which is full, the two free ports will accept the cell, but the third will be discarded. Multicast cells will typically be part of video or audio streams which can often tolerate a moderate amount of cell loss.

Cells will remain in derail buffer 740 until the overflow conditions have subsided. Normally this will be measured as a period of time in which a switching request has not been initiated. As mentioned above, when there are no pending cells to be switched switch controller 120 will generate a dummy switch cycle which will produce a Route Word 540 corresponding to an IDLE exception. Upon detecting the IDLE switch cycle, if cells are present in derail buffer 740 microprocessor 110 will execute rerailing code which will move each cell in turn from the front of the circular buffer to the appropriate transmit FIFO as identified by the accompanying information. This process will continue until there are no cells remaining in derail buffer 740 or until a cell at the front of the circular buffer cannot be moved because the intended transmit FIFO is full. If cells do remain in derail buffer 740, then microprocessor 110 will set a rerailing time counter, described below, to ensure that it will have another opportunity to rerail those cells a very short time later, e.g. 60 $\mu$s (four cell times on a 25.6 Mb/s line).

Although rerailing will normally occur when the switch is not significantly busy, it would not be wise to allow derailed cells to languish indefinitely in derail buffer 740 despite heavy switching traffic. To prevent this situation, switch controller 120 maintains a switching time counter which is used to give microprocessor 110 an opportunity to attempt rerailing during times of continual switching requests. Every fixed period of time, e.g. 1 $\mu$s, the switching time counter is decremented if a switch request occurred during that period. When the switching time counter reaches zero, switch controller 120 will generate an IDLE switch cycle rather than respond to the next selected input port 210-i. Microprocessor 110 will rerail as many cells as possible using the same procedure as described above during this IDLE cycle.

Conversely, derailed cells could also remain in the buffer indefinitely if there were no switching traffic. Under these conditions the switching software would not be executed, therefore rerailing, which is performed when the switching software is exited, would not occur. Switch controller 120 provides a rerailing time counter to address this contingency. This counter is initialized and activated by microprocessor 110, as mentioned above, when cells remain in derail buffer 740 after a rerailing operation, and is decremented at fixed intervals, e.g. 1 $\mu$s. If the counter reaches zero before any switch request occurs, switch controller 120 will generate an IDLE switch cycle, permitting rerailing in the same fashion as described above. If a switch request does occur before the counter reaches zero, the counter is deactivated.

At some point when all the cells belonging to a single virtual circuit are removed from derail buffer 740, microprocessor 110 will again modify the routing table 720 entry for the virtual circuit, such that the next cell on that circuit will not be derailed, but will be switched directly to the appropriate output port as described above. This might be done immediately after the last derailed cell of that virtual circuit is removed from derail buffer 740, however a less aggressive mechanism is desirable. Derailing is usually the result of either a transient overload on a virtual circuit, or continual bursty traffic on a virtual circuit. Both situations benefit from a process whereby microprocessor 110 monitors the load on a virtual circuit for a period of time before deciding to restore the virtual circuit to full hardware switching.

In the preferred embodiment of the present invention only one derail buffer 740 is utilized, shared between all virtual circuits. Alternatively, multiple buffers (or multiple logical buffers in one physical memory) may be used, for example, one buffer per transmit FIFO. Multiple buffers present the advantage of fairness; one busy transmit FIFO is not permitted to hold up the transmission of derailed cells destined for other transmit FIFOs. Such fairness is achieved, however, at the cost of simplicity. Derailing and rerailing must be as fast as possible; time spent managing multiple buffers would be significant compared to the time taken to transfer a cell.

It should also be noted that although in the preferred embodiment an overflow condition is defined as a buffer without the capacity to accept another cell, other implementations are possible. For instance, an overflow condition might be defined as an occupancy above a certain threshold. In this case, lower priority cells destined for the output port could be derailed, while high priority cells could be placed directly in the buffer to await immediate transmission. This mechanism would add additional complexity, but would be suitable for some implementations.

Figure 13:
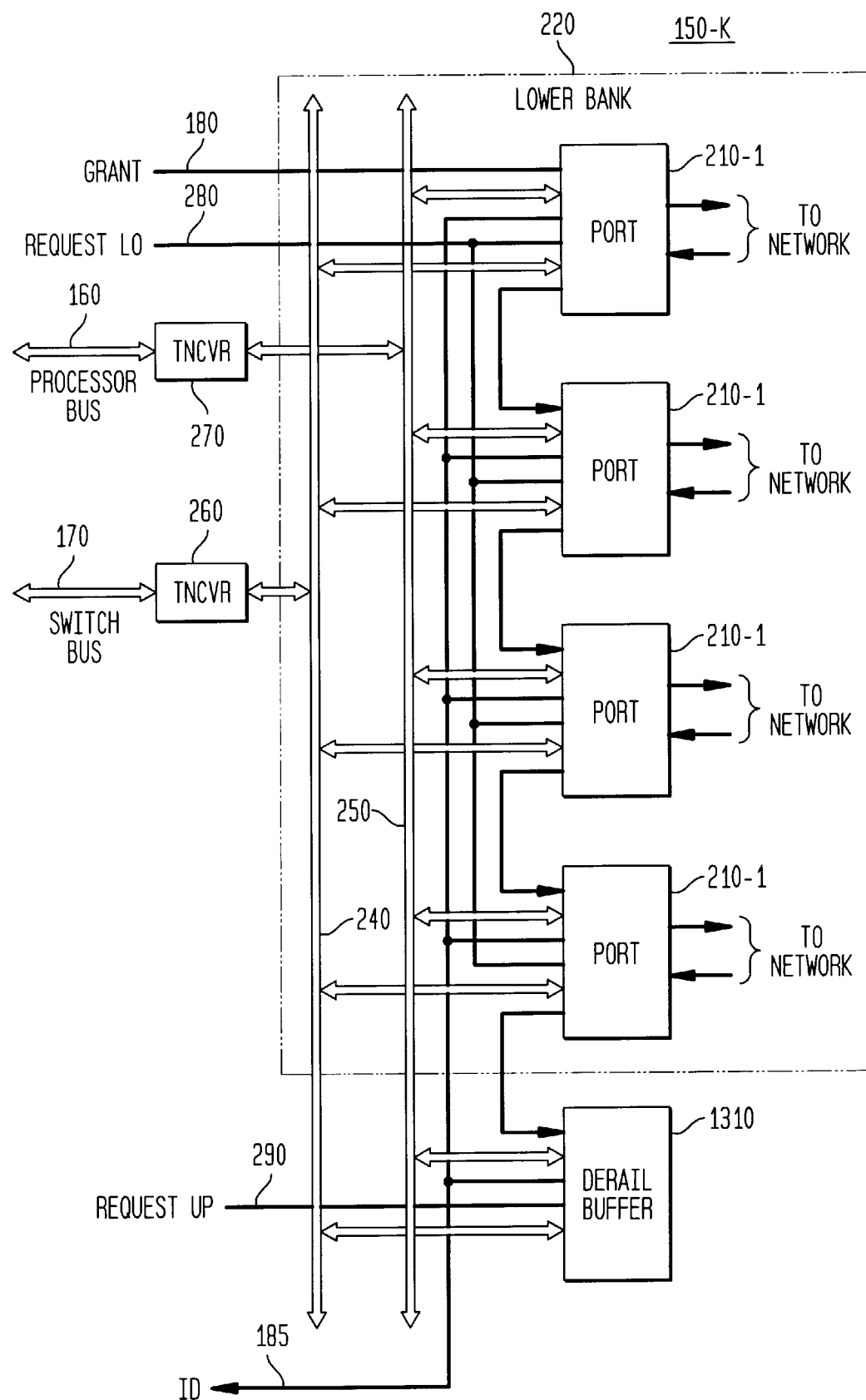
FIG. 13 is a functional block diagram of a second embodiment of a port cluster used in the ATM switch of FIG. 1 where the upper port bank is populated with a single derail interface.

Those of ordinary skill in the art will recognize that the above derailing scheme is not the only implementation possible, and in fact, a wide variety of derailing methods are within the scope of the present invention. For example, as shown in FIG. 13, derailing can proceed semi-automatically by substituting a hardware derail interface 1310 for a single port 210-i. FIG. 13 illustrates a single port cluster 150-k containing a fully populated lower port bank 220 and a single derail interface 1310 in the upper port bank 230. Of course, upper port bank 230 could be populated with additional ports 210-i.

As before, a COPY ABORT 470 will be generated when an overflow condition is detected which, as before, will result in an exception handling switch cycle. In addition to moving the cell to the derail interface 1310, the exception handling procedure will also modify the entry for this particular virtual connection in routing table 720 such that future cells will automatically be directed to derail interface 1310.

Figure 14:
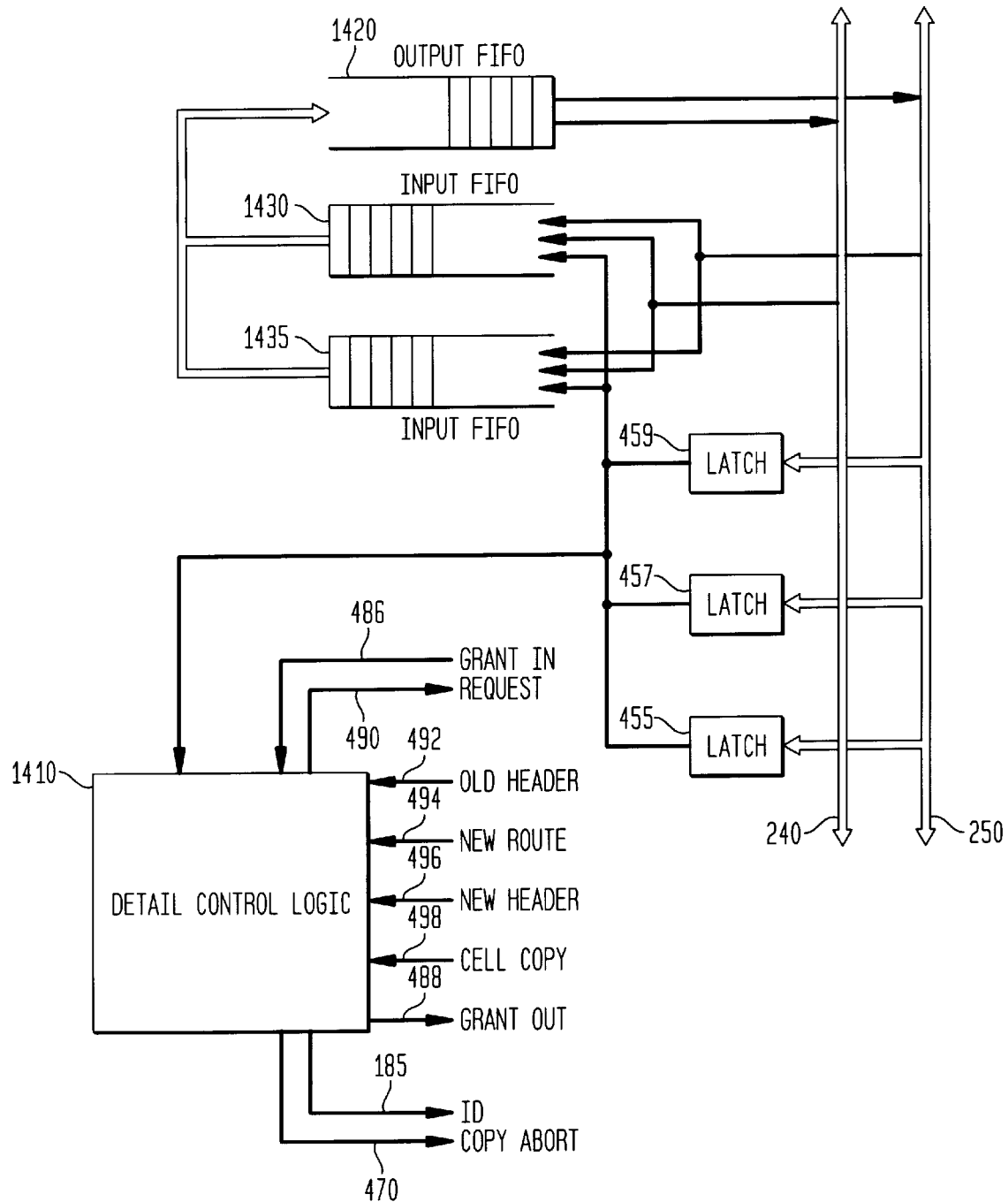
FIG. 14 is a functional block diagram of the derail interface shown in FIG. 13.

Derail interface 1310 appears to the rest of the switch as a standard port interface 210-i and operates in the following way. As shown in FIG. 14, a derailed cell is placed in either derail "input" FIFO 1430 or derail "input" FIFO 1435, depending on the state of priority bit 860 in Route Word 540. Derail control logic 1410 controls the interface in the same manner as port control logic 450 controls a standard port interface, as described above. In addition, derail control interface 1410 copies cells, on a priority basis, from derail "input" FIFOs 1430, 1435 to derail "output" FIFO 1420. Derail interface 1310 then acts as a standard interface in presenting cells resident in derail "output" FIFO 1420 to the switch for servicing.

The rerailing mechanism operates as a standard switch cycle. Each cell serviced from derail "output" FIFO 1420 will be switched to its appropriate output port according to table entries in routing table 720 added during the exception handling procedure which initiated derailing.

If an overflow condition is detected when rerailing a cell, COPY ABORT 470 will again be asserted. However, a different exception routine will be executed which will cause microprocessor 110 to abort the switch cycle leaving the cell in its current location in the derail "output" FIFO 1420. This operation is necessary to ensure cell order is maintained.

When the last cell is removed from the derail interface FIFOs, an exception handling cycle is generated which restores the table entries in routing table 720 to their former values. Thus, switching can then proceed normally, without automatic derailing.

As will be recognized by those of skill in the art, certain network signalling methods do exist to alleviate congestion. For example, microprocessor 110 might transmit a special signalling cell to a particular source end-node requesting that source to slow transmission. Of course, in periods of severely heavy traffic switch 100 will be spending all of its time switching cells, preventing microprocessor 110 from transmitting any such signalling cells. The switching time counter used in the derailing process can also be employed to provide microprocessor 110 an opportunity to send signalling and management cells. When the counter expires and switch controller 120 generates an IDLE switch cycle, microprocessor 110 can use the cycle to send OAM cells as well as handle any necessary rerailing. Periodic expiration of the switching time counter can reserve a minimum percentage of processing time for signalling and management functions. This reserved time is allocated in very small intervals, using a processing time counter, so that other processing never holds up switching for too long. (Long suspensions of switching could result in input FIFO overflow.) By using preset values for the switching and processing time counters, a permanent allocation of processor time between switching and non-switching functions can be achieved. For instance, a division yielding ninety percent switching time and ten percent non-switching time permits signalling and management to be performed without a marked increase in cell loss probability. The processor can resume switching early if it has no need for a reserved slot; thus the mechanism has little overhead.

Derailing controls congestion problems occurring in transmit FIFOs; unfortunately little can be done to alleviate congestion in receive FIFOs. If switch 100 is under such heavy traffic that an input port 210-i cannot be serviced frequently enough to avoid overflow conditions in its receive FIFO 440, then subsequent receive cells will need to be discarded.

However, some prioritization can be performed in selecting cells for discard. The CLP flag 370, a single bit in the standard ATM cell header 320, defines the priority of a cell for discard. If CLP 370 is set, then the cell contains information which is less critical and the cell may be discarded first in severe congestion conditions. For example, as mentioned above, certain cells in multimedia streams can be discarded resulting only in a mild distortion of the output video or audio, whereas data streams often cannot tolerate data loss without more catastrophic effects.

Network control logic 430 implements this selective discard within the input port 210-i itself. When the receive FIFO 440 reaches some threshold occupancy, e.g. ninety percent, network control logic 430 will begin to discard incoming cells which have CLP 370 set, thereby reserving the remaining buffer space for higher priority cells. When receive FIFO 440 falls below that threshold, all cells will again be placed into the buffer. Of course, if receive FIFO 440 reaches one hundred percent occupancy, then all incoming cells must be discarded until buffer space again becomes available.

It should be understood that various other modifications will also be readily apparent to those skilled in the art without departing from the scope and spirit of the invention. Accordingly, it is not intended that the scope of the claims appended hereto be limited to the description set forth herein, but rather that the claims be construed as encompassing all the features of the patentable novelty that reside in the present invention, including all features that would be treated as equivalents thereof by those skilled in the art to which this invention pertains.

What is claimed is:

1. A method of switching information from input links to one or more output links using a packet switch comprising the steps of:

receiving information represented as a cell having a routing identifier on an input link;

hashing the routing identifier with an input link identifier, stored in the switch, which is associated with the input link, to obtain an index to a routing table which is stored in the switch;

indexing the routing table using the index to obtain an output link identifier which is associated with one or more of said output links;

reading, simultaneously at all of said output links and at the packet switch, the routing identifier and the output link identifier, whereby the input link and one or more of said output links are selected; and switching the information from the selected input link to each selected output link.

2. The method of claim 1 wherein the switch is an asynchronous transfer mode switch, and wherein the cell comprises a header and a payload, and the header includes the routing identifier.

3. The method of claim 2 wherein the step of indexing the routing table using the index further includes obtaining a new header descriptor associated with the output link identifier and wherein the method further comprises modifying the header of the cell in accordance with the new header descriptor and reading the new header descriptor at each selected output link.

4. The method of claim 1 further comprising the steps of:

detecting a cell, provided on the input links, indicating the presence of an exception condition; and executing, using a processor in the switch, a special processing routine for resolving the exception condition.

5. The method of claim 4 wherein the output link identifier includes an indicator specifying the exception condition.

6. The method of claim 4 wherein the step of indexing further includes obtaining a jump address to the special processing routine.

7. The method of claim 2 further comprising the steps of:

providing an input buffer for the input link;

storing the received cell in the input buffer;

providing an output buffer for the output link; and moving the cell from the input buffer to the output buffer.

8. The method of claim 7 wherein the input and output links include multiple input and output buffers, respectively, and wherein the method further comprises selecting a cell stored in one of the input buffers.

9. The method of claim 8 wherein the selection step comprises:

determining which input buffers contain at least one cell at a given time;

granting a token to a first one of the input buffers determined to contain at least one cell; and passing the token sequentially to each of the other input buffers determined to contain at least one cell.

10. The method of claim 7 wherein the step of moving the cell comprises moving the header of the cell along a first bus and moving the payload of the cell along a second bus.

11. The method of claim 2 wherein the routing identifier is a VPI and the header includes a VCI, and wherein the method further comprises:

detecting the end-point of a virtual path corresponding to the VPI of the routing identifier;

hashing the VCI of the header with the input link identifier to obtain a second routing table index; and indexing the routing table using the second routing table index to obtain the output link identifier.

12. The method of claim 7 wherein the cell is a multicast cell, and wherein:

the indexing step includes obtaining a plurality of output link identifiers and associated new header descriptors;

the moving step includes copying the cell into a plurality of output buffers, each of which corresponds to an output link selected in accordance with one of the output link identifiers; and the method further comprises modifying the cell in each of the output buffers in accordance with the associated new header descriptor.

13. The method of claim 7 wherein the header includes a header error control byte, and wherein the method further comprises removing the header error control byte from the received cell before storing the received cell in the input buffer.

14. The method of claim 7 wherein the header includes a cell loss priority flag, and wherein the method further comprises discarding a received cell containing a set cell loss priority flag when the input buffer is above a threshold cell occupancy.

15. A system for switching information from input links to output links in a packet switch comprising:

input links for providing information represented as a cell having a routing identifier to the packet switch;

a memory for storing a routing table containing output link identifiers;

a switch controller for hashing the routing identifier with an input link identifier, stored in the packet switch, associated with the input link to obtain an index to the routing table, and for indexing the routing table using the index to obtain an output link identifier;

control logic means in all of the output links for reading the routing identifier and the output link identifier simultaneously with the switch controller, whereby the input and output links are selectively connected for switching said information from the input to the output links.

16. The system of claim 15 wherein the packet switch is an asynchronous transfer mode switch, and wherein the cell comprises a header, which includes the routing identifier, and a payload.

17. The system of claim 16 wherein the switch controller includes means for indexing the routing table to obtain a new header descriptor associated with the output link identifier, said output links reading the new header descriptor.

18. The system of claim 17 further comprising means for modifying the header of the cell in accordance with the new header descriptor.

19. The system of claim 15 further comprising:

means for detecting a cell, provided on the input links, indicating the presence of an exception condition; and a processor for executing a special processing routine for resolving the exception condition.

20. The system of claim 19 wherein the output link identifier includes an indicator specifying the exception condition.

21. The system of claim 19 wherein the switch controller includes means for indexing the routing table to obtain a jump address to the special processing routine.

22. The system of claim 15 further comprising:

an input buffer provided for the input link for storing the cell; and a bus for moving the cell from the input buffer to an output buffer provided for the output link.

23. The system of claim 22 further comprising multiple input and output buffers for input and output links, respectively, and means for selecting a cell stored in one of the input buffers for processing by the switch controller.

24. The system of claim 23 wherein the cell selecting means comprises:

means for determining which input buffers contain at least one cell at a given time;

means for granting a token to a first one of the input buffers determined to contain at least one cell; and means for passing the token sequentially to each of the other input buffers determined to contain at least one cell.

25. The system of claim 22 wherein the bus comprises a first bus for moving the header of the cell and a second bus for moving the payload of the cell.

26. The system of claim 16 wherein the routing identifier is a VCI.

27. The system of claim 16 wherein the routing identifier is a VPI.

28. The system of claim 16 wherein the routing identifier is a VPI and the header further includes a VCI, and wherein the switch controller includes means for detecting the end-point of a virtual path corresponding to the VPI, means for hashing the VCI with the input link identifier to obtain a second routing table index, and means for indexing the routing table using the second routing table index to obtain the output link identifier.

29. The system of claim 22 wherein the cell is a multicast cell, and wherein the switch controller includes means for indexing the routing table to obtain a plurality of output link identifiers and associated new header descriptors, and further comprising:

means for copying the cell into a plurality of output buffers, each of which corresponds to an output link selected in accordance with one of the output link identifiers; and means for modifying the header in the cell in each of the output buffers in accordance with the associated new header descriptor.

30. The system of claim 22 wherein the header includes a header error control byte, and further comprising means for removing the header error control byte from the cell before the cell is stored in the input buffer.

31. The system of claim 22 wherein the header includes a cell loss priority flag, and further comprising means for discarding a cell containing a set cell loss priority flag when the input buffer is above a threshold cell occupancy.

32. An asynchronous transfer mode switch for switching cells from input links to output links, each cell having a header and a payload, the header having at least one routing identifier, and each input link associated with a link identifier, comprising:

input buffers coupled to the input links for storing the cells received therefrom;

output buffers coupled to the output links for storing cells for transmission to the output links;

a routing table for storing routing tags and new header descriptors;

a switch controller for reading the header of a selected cell from a selected input buffer, hashing the routing identifier of the header with the associated input link identifier to obtain a routing table index, and using the index to acquire a routing tag and new header descriptor from the routing table;

a bus for moving the selected cell from the selected input buffer to an output buffer selected in accordance with the routing tag;

means coupled to the output links for reading the routing tag and new header descriptor at the same time the switch controller reads the routing tag and new header descriptor; and means coupled to the output links for modifying the header of a selected cell in accordance with the new header descriptor.

33. The switch of claim 32 wherein the routing tag includes an indicator specifying the presence of an exception condition in connection with the switching of a selected cell.

34. The switch of claim 33 further comprising a processor responsive to the indicator in the routing tag for executing a selected processing routine for resolving the exception condition.

35. The switch of claim 34 wherein the new header descriptor includes a jump address to the selected processing routine.

36. The switch of claim 34 wherein the processor includes means for initiating the switching of the selected cell.

37. The switch of claim 32 further comprising an input buffer selector for selecting one of the input buffers from among input buffers containing at least one cell.

38. The switch of claim 37 wherein the input buffer selector comprises:

means for determining which input buffers contain at least one cell at a given time;

token granting means for selecting a first one of the input buffers determined to contain at least one cell; and token passing means for sequentially selecting each of the other input buffers determined to contain at least one cell after the previous selected input buffer has been recognized by the switch controller.

39. The switch of claim 32 wherein the bus includes a first bus for moving the payload of the selected cell and a second bus for moving the header of the selected cell.

40. The switch of claim 39 wherein the first and second buses each comprises:

a plurality of local buses, each local bus interconnecting a subset of the input and output buffers; and a global bus for interconnecting the local buses.

41. The switch of claim 32 wherein the output buffers includes at least a high-priority buffer and a low-priority buffer provided for each output link, the high-priority buffer for storing high-priority cells as specified by the routing tag, and the low-priority buffer for storing other cells.

42. The switch of claim 41 further comprising means for transmitting all cells stored in the high-priority buffer to the output link before cells stored in the low-priority buffer are transmitted.

43. The switch of claim 32 wherein the header includes a header error control byte and further comprising means coupled to the input links for removing the header error control byte from the header of each cell before the cell is stored in the input buffer.

44. The switch of claim 32 wherein the header includes a cell loss priority flag and further comprising means for discarding cells containing a set cell loss priority flag received on an input link when the input buffer is above a threshold occupancy.

45. The switch of claim 32 wherein the routing tag designates a plurality of output buffers.

46. The switch of claim 32 wherein a plurality of output buffers are selected in accordance with a plurality of routing tags.

47. The switch of claim 32 wherein the routing identifier is a VCI.

48. The switch of claim 32 wherein the routing identifier is a VPI.

49. The switch of claim 32 wherein the routing identifier is a VPI and the header further includes a VCI, and wherein the switch controller includes means for detecting a virtual path end-point, extracting a VCI from the header, hashing the VCI with the input link identifier to obtain a second routing table index, and using the second routing table index to acquire the routing tag and new header descriptor.

50. The switch of claim 32 wherein the switch controller includes a field programmable gate array.

51. The switch of claim 32 wherein the input and output buffers are first-in, first-out (FIFO) buffers.

* * * * *